US006940807B1

(12) United States Patent
Rezvani et al.

(10) Patent No.: US 6,940,807 B1
(45) Date of Patent: Sep. 6, 2005

(54) METHOD AND APPARATUS FOR A X-DSL COMMUNICATION PROCESSOR

(75) Inventors: Behrooz Rezvani, Pleasanton, CA (US); Avadhani Shridhar, Santa Clara, CA (US); Raminder S. Bajwa, Palo Alto, CA (US); Tiruvur R. Ramesh, Union City, CA (US); Masoud Eskandari, San Jose, CA (US); Firooz Massoudi, Santa Clara, CA (US); Sam Heidari, Fremont, CA (US); Omprakash S. Sarmaru, Fremont, CA (US); Sridhar Begur, Cupertino, CA (US)

(73) Assignee: Velocity Communication, Inc., Fremont, CA (US)

( * ) Notice: Subject to any disclaimer, the term of this patent is extended or adjusted under 35 U.S.C. 154(b) by 877 days.

(21) Appl. No.: 09/699,193

(22) Filed: Oct. 26, 2000

Related U.S. Application Data

(60) Provisional application No. 60/179,862, filed on Feb. 2, 2000, and provisional application No. 60/161,744, filed on Oct. 26, 1999.

(51) Int. Cl.[7] .................................................. H04J 11/00

(52) U.S. Cl. ........................................ 370/210; 370/352

(58) Field of Search ................................. 370/352, 353, 370/354, 357, 356, 359, 389, 392, 395.52, 419, 420, 421, 437, 465, 468, 474, 476, 493, 494, 495, 210; 375/219, 220, 222, 229

(56) References Cited

U.S. PATENT DOCUMENTS 4,080,661 A 3/1978 Niwa
4,689,762 A 8/1987 Thibodeau, Jr.
5,163,017 A 11/1992 Wong et al.
5,668,857 A 9/1997 McHale
5,987,005 A 11/1999 Fertner et al.
6,003,056 A 12/1999 Auslander et al.
6,055,268 A 4/2000 Timm et al.
6,098,088 A 8/2000 He et al.
6,122,703 A 9/2000 Nasserbakht (Continued)

OTHER PUBLICATIONS

Ali, Decimation–in–Time–Frequency FFT Algorithm, 1994, IEEE, pp. 453–456.

*Primary Examiner*—Phirin Sam
(74) *Attorney, Agent, or Firm*—IP Creators; Charles C Cary

(57) ABSTRACT

The current invention provides a DSP which accommodates multiple current X-DSL protocols and is further configurable to support future protocols. The DSP is implemented with shared and dedicated hardware components on both the transmit and receive paths. The DSP implements both the discrete Fourier transform (DFT) and inverse discrete Fourier transform (IDFT) portions across a wide range of sample sizes and X-DSL protocols. Multiple channels, each with varying ones of the X-DSL protocols can be handled in the same session. The DSP offers the speed associated with hardware implementation of the transforms and the flexibility of a software only implementation. Traffic flow is regulated in the chip using a packet based schema in which each packet is associated with a specific channel of upstream and downstream data. Header and control information in each packet is used to govern the processing of each packet as it moves along either the transmit path or receive path. The DSP of the current invention may advantageously be utilized in fields other than communications, such as: medical and other imaging, seismic analysis, radar and other military applications, pattern recognition, signal processing etc. The present invention provides a signal processing architecture that supports scalability of CO/DLC/ONU resources, and allows a significantly more flexible hardware response to the evolving X-DSL standards without over committing of hardware resources. As standards evolve hardware may be reconfigured to support the new standards.

13 Claims, 23 Drawing Sheets

U.S. PATENT DOCUMENTS

| | | | | | |
|---|---|---|---|---|---|
| 6,137,839 | A | | 10/2000 | Mannering et al. | |
| 6,201,830 | B1 | * | 3/2001 | Chellali et al. | 375/222 |
| 6,230,177 | B1 | | 5/2001 | Gossett et al. | |
| 6,240,141 | B1 | | 5/2001 | Long | |
| 6,334,219 | B1 | | 12/2001 | Hill et al. | |
| 6,370,188 | B1 | * | 4/2002 | Wu et al. | 375/222 |
| 6,401,162 | B1 | | 6/2002 | Nasserbakht | |
| 6,519,250 | B1 | * | 2/2003 | Fan | 370/352 |
| 6,519,280 | B1 | * | 2/2003 | Cole | 375/222 |
| 6,674,768 | B1 | * | 1/2004 | Okamura | 370/468 |

* cited by examiner

DSP PACKETS

FIG. 9A
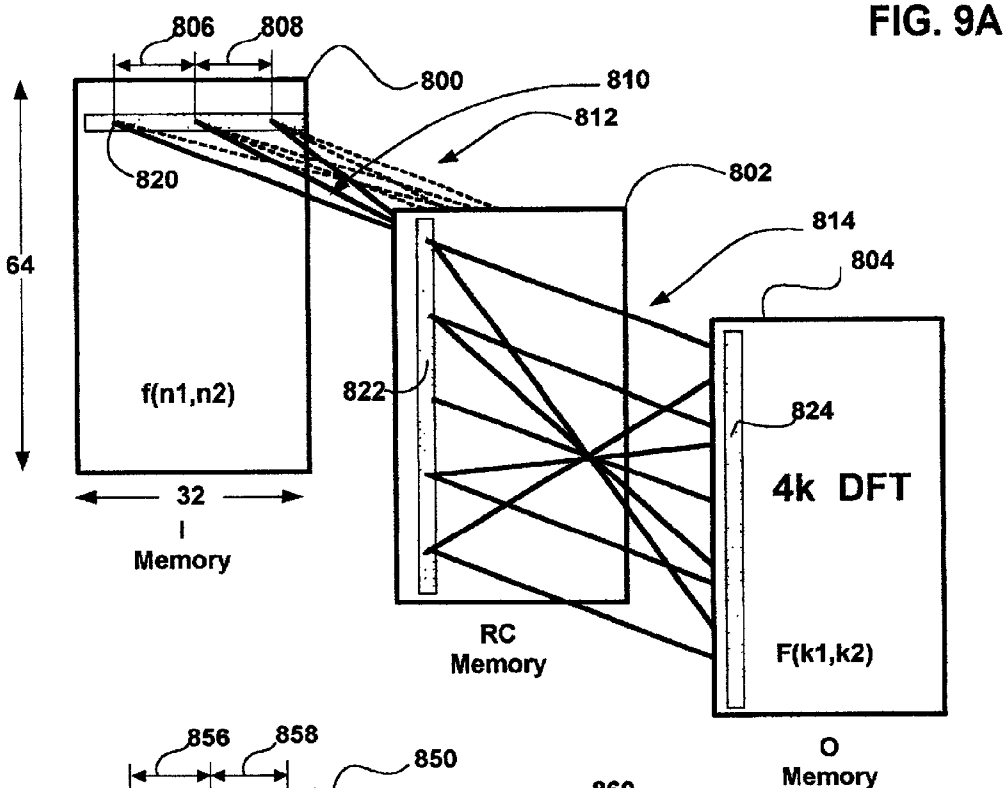
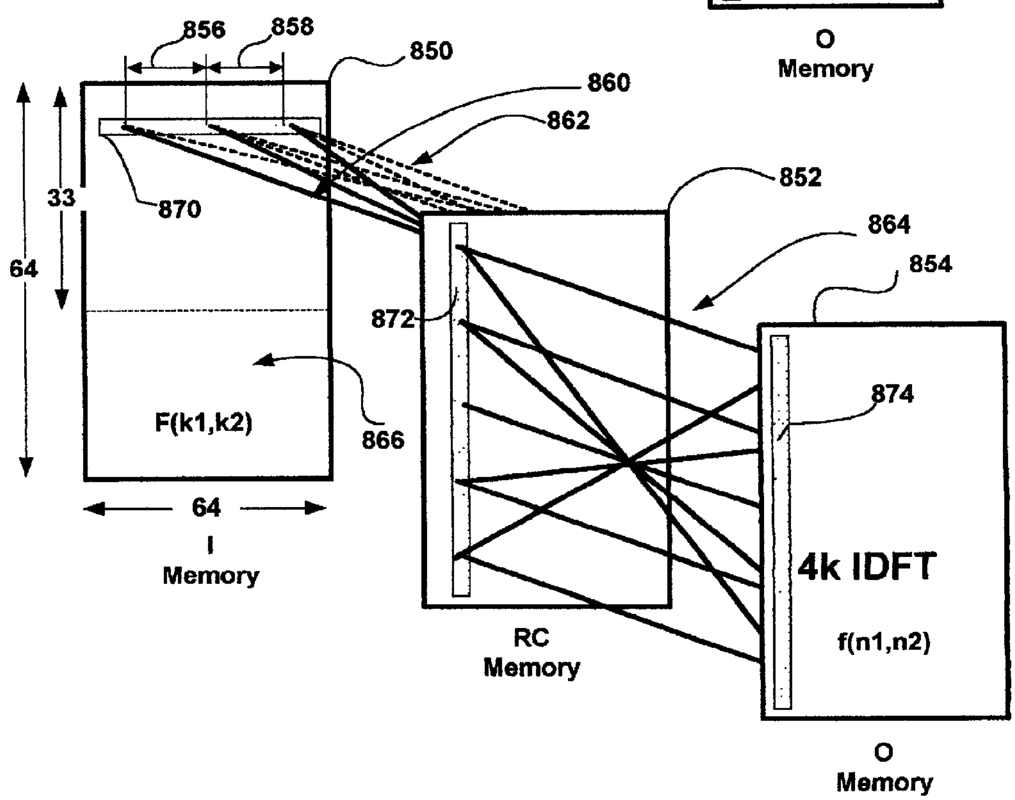
FIG. 9B

| TRANSMIT | G.LITE | ADSL | VDSL | Other |
|---|---|---|---|---|
| Sample space | 256 | 512 | 512 , 1024, 2048, 4096 | |
| # Tones | 128 | 256 | 256, 512, 1024, 2048 | |
| Cyclic Prefix | 16 | 32 | Programmable | |
| : | : | : | : | : |
| Switching | High Pass Filter | High Pass Filter | None | |

FIG. 11A

| RECEIVE | G.LITE | ADSL | VDSL | Other |
|---|---|---|---|---|
| Sample space | 64 | 64 | 512 , 1024, 2048, 4096 | |
| # Tones | 32 | 32 | 256, 512, 1024, 2048 | |
| Cyclic Prefix | 4 | 4 | Programmable | |
| : | : | : | : | : |
| Switching | | | | |

| Sample | ROW TRANSFORM | | COLUMN TRANSFORM | |
|---|---|---|---|---|
| 4k | 64 | 16 | 64 | 16 |
| 2k | 32 | 8 | 64 | 16 |
| 1k | 32 | 8 | 32 | 8 |
| 512 | 16 | 4 | 32 | 8 |
| 256 | 16 | 4 | 16 | 4 |
| 128 | 8 | 2 | 16 | 4 |
| 64 | 64 | 16 | 1 | 1 |

DFT

IDFT

DFT

IDFT

BUS PACKETS
TRANSMIT
1800
1802
Chan/Reg Address
DSP Id
AFE Id
Transmit Length
Receive Length
R/W
Data: Ch/ Reg
1804
1806
1808
1810
1812
1814
1816
300

RECEIVE
1820
1822
Chan/Reg Address
DSP Id
AFE Id
Receive Length
Data: Ch/ Reg
1824
1826
1828
1830
300

METHOD AND APPARATUS FOR A X-DSL COMMUNICATION PROCESSOR

CROSS REFERENCE TO RELATED APPLICATION

This application claims the benefit of prior filed co-pending Provisional Application No. 60/161,744 entitled "BURST MODE ENGINE" and filed on Oct. 26, 1999; and co-pending Provisional Application No. 60/179,862 entitled "DMT ENGINE" filed on Feb. 2, 2000 of the above-cited applications is incorporated herein by reference in its entirety.

BACKGROUND OF THE INVENTION

1. Field of Invention

This invention relates generally to communications, and more particularly, digital signal processors which provide support for multiple X-DSL protocols.

2. Description of the Related Art North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, SDSL, MDSL, RADSL, HDSL, etc. all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation.

X-DSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop. Modems essentially have three hardware sections: (a) an analog front end (AFE) to convert the analog signals on the subscriber line into digital signals and convert digital signals for transmission on the subscriber line into analog signals, (b) digital signal processing (DSP) circuitry to convert the digital signals into an information bit stream and optionally provide error correction, echo cancellation, and line equalization, and (c) a host interface between the information bit stream and its source/destination. Typically all of these components are located on a highly integrated single line card with a dedicated connection between one or more AFE's and a DSP.

Within each X-DSL protocol there are at least two possible line codes, or modulation protocols, i.e. discrete multitone (DMT) and carrierless AM/PM (CAP). The first of these line codes, i.e. DMT, requires the DSP to implement both an inverse fast Fourier transform (IFFT) on upstream data received from the subscriber and a fast Fourier transform (FFT) on the downstream data transmitted to the subscriber. Typically the DSP is available as a discrete semiconductor chip which implements the transforms for a dedicated one of the X-DSL standards using software routines running on an internal processor.

Each X-DSL installation represents a sizeable expense in hardware and service labor to provision the central office. The expense may not always be amortized over a sufficient period of time due the relentless introduction of new and faster X-DSL standards each of which pushes the performance boundaries of the subscriber line in the direction of increasing bandwidth and signal integrity. As each new standard involves, line cards must typically be replaced to upgrade the service.

What is needed is a less rigid signal DSP processing architecture that allows a more flexible hardware response to the evolving X-DSL standards and the problems associated with providing hardware to handle each new standard.

SUMMARY OF THE INVENTION

The current invention provides a DSP and specifically a transform portion thereof which accommodates multiple current X-DSL protocols and is further configurable to support future protocols. The DSP is implemented with shared and dedicated hardware components on both the transmit and receive paths. The DSP implements both the discrete Fourier transform (DFT) and inverse discrete Fourier transform (IDFT) portions across a wide range of sample sizes and X-DSL protocols. Multiple channels, each with varying ones of the X-DSL protocols can be handled in the same session. The DSP offers the speed associated with hardware implementation of the transforms and the flexibility of a software only implementation. Traffic flow is regulated in the chip using a packet based schema in which each packet is associated with a specific channel of upstream and downstream data. Header and control information in each packet is used to govern the processing of each packet as it moves along either the transmit path or receive path. The DSP of the current invention may advantageously be utilized in fields other than communications, such as: medical and other imaging, seismic analysis, radar and other military applications, pattern recognition, signal processing etc.

The present invention provides a signal processing architecture that supports scalability of CO/DLC/ONU resources, and allows a significantly more flexible hardware response to the evolving X-DSL standards without over committing of hardware resources. As standards evolve hardware may be reconfigured to support the new standards.

In an embodiment of the invention a DSP is disclosed for processing upstream and downstream channels of data. The DSP comprises packet assemblers and disassemblers and a transceiver circuit. The packet assemblers and disassemblers for assembling and disassembling each upstream and downstream channel of data into corresponding upstream and downstream packets. Each of the packets include an indicia corresponding with the respective channel and processing thereof. The transceiver circuit includes both dedicated and shared components which form a receive path for demodulating and decoding the upstream packets and a transmit path for encoding and modulating the downstream packets. Several of the dedicated and shared components are responsive to the indicia within each of said upstream and downstream packets to vary the processing of the data contained therein.

In still another embodiment of the invention a method for processing upstream and downstream channels of data is disclosed. The method comprises the acts of:

assembling and disassembling each upstream and downstream channel of data into corresponding upstream and downstream packets each including an indicia corresponding with the respective channel and processing thereof; and forming a receive path for demodulating and decoding the upstream packets in a manner responsive to the indicia contained therein; and forming a transmit path for encoding and modulating the downstream packets in a manner responsive to the indicia contained therein.

BRIEF DESCRIPTION OF THE DRAWINGS

These and other features and advantages of the present invention will become more apparent to those skilled in the art from the following detailed description in conjunction with the appended drawings in which:

FIGS. 9AB are isometric representations of the two dimensional implementation of the Fourier transform in accordance with an embodiment of the current invention.

FIGS. 11A–C show the data structures which may be downloaded to the DSP to govern its response various of the X-DSL protocols.

DETAILED DESCRIPTION OF THE EMBODIMENTS

The current invention provides a DSP and specifically a transform portion thereof which accommodates multiple current X-DSL protocols and is further configurable to support furture protocols. The DSP is implemented with shared and dedicated hardware components on both the transmit and receive paths. The DSP implements both the discrete Fourier transform (DFT) and inverse discrete Fourier transform (IDFT) portions across a wide range of sample sizes and X-DSL protocols. Multiple channels, each with varying ones of the X-DSL protocols can be handled in the same session. The DSP offers the speed associated with hardware implementation of the transforms and the flexibility of a software only implementation. Traffic flow is regulated in the chip using a packet based schema in which each packet is associated with a specific channel of upstream and downstream data. Header and control information in each packet is used to govern the processing of each packet as it moves along either the transmit path or receive path. The DSP of the current invention may advantageously be utilized in fields other than communications, such as: medical and other imaging, seismic analysis, radar and other military applications, pattern recognition, signal processing etc. The present invention provides a signal processing architecture that supports scalability of CO/DLC/ONU resources, and allows a significantly more flexible hardware response to the evolving X-DSL standards without over committing of hardware resources. As standards evolve hardware may be reconfigured to support the new standards.

Figure 1:
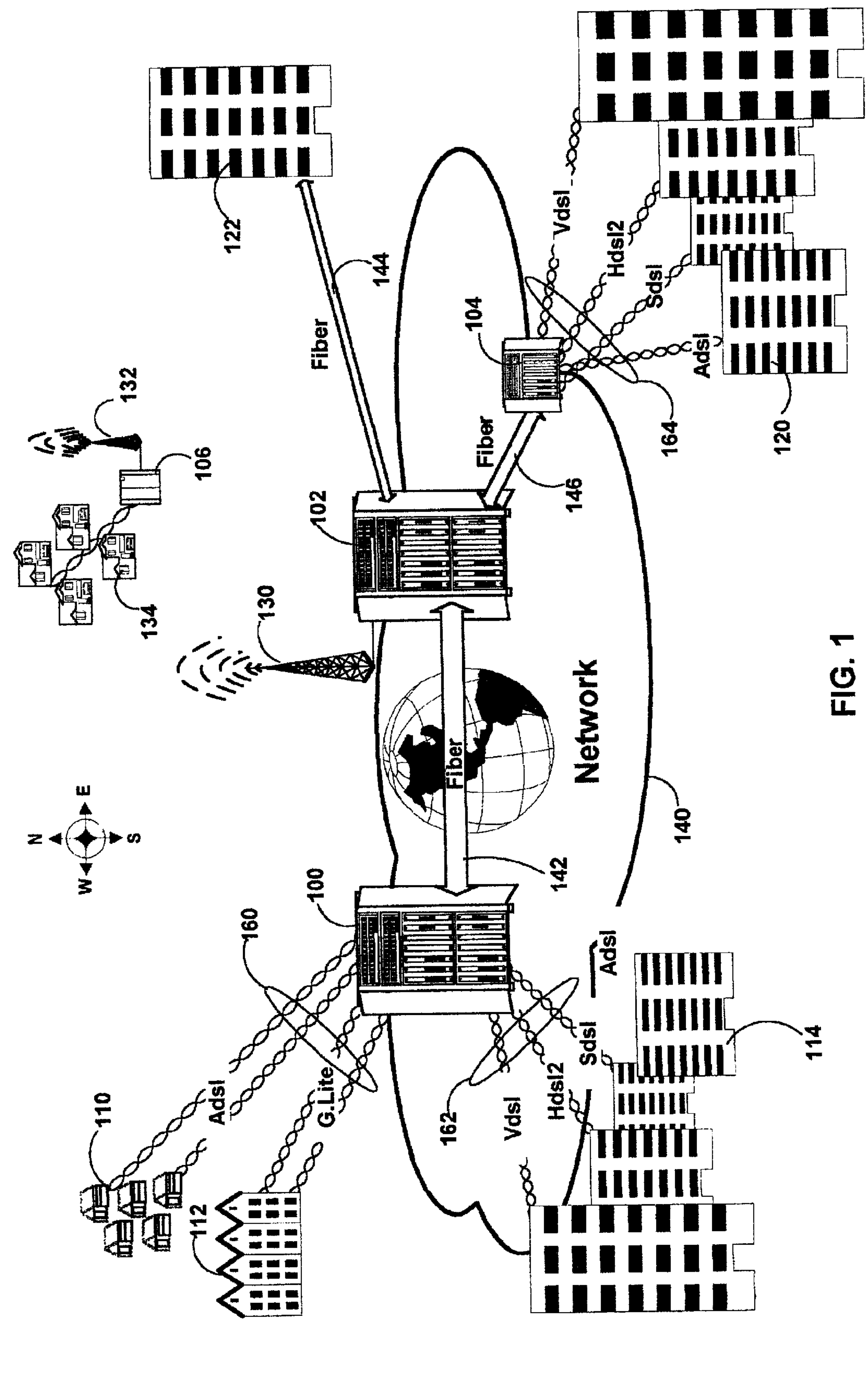
FIG. 1 depicts an overall system environment in which individual subscribers are coupled across public service telephone network (PSTN) subscriber lines with one or more high speed networks.

FIG. 1 depicts an overall system environment in which individual subscribers are coupled across public service telephone network (PSTN) subscriber lines with one or more high speed networks. Telco COs 100, 102, 106 and remote access terminal 104 are shown coupling various subscribers to one another and to a high speed network 140. The high speed network 140 provides fiber optic links between the central office and remote access terminal. CO's 100–102 are coupled to one another via fiber optic link 142. CO 102 couples to remote access terminal 104 via fiber optic link 146. CO also couples to subscriber site 122 via fiber optic link 144. CO 102 and CO 106 couple to one another via a wireless link provided by corresponding wireless transceivers 130 and 132 respectively. The "last mile" connecting each subscriber, (except subscriber 122) is provided by twisted copper PSTN telephone lines On these subscriber lines voice band and data communication are provided. The data communication is shown as various X-DSL protocols including G.Lite, ADSL VDSL, and HDSL2. CO 100 is coupled via G.Lite and ADSL modulated subscriber line connections 160 with subscribers 110 and 112. CO 100 is also coupled via G.Lite and ADSL modulated subscriber line connections 162 with subscriber 114. CO 106 is also coupled via a subscriber line to subscriber 134. Remote access terminal is coupled via subscriber line connections 164 with subscribers 120. In each case the corresponding CO may advantageously be provided with distributed AFE and DSP resources for handling multiple protocols from multiple locations with the added benefit of load balancing, and statistical multiplexing. The apparatus and method of the current invention is suitable for handling communications on any of these subscriber lines.

In an alternate embodiment of the invention communications are also provided between DSP resources at one site, e.g. CO 100 and AFE resources at a separate site, e.g. CO 102. This later capability allows distributed processing whereby all DSP resources can be placed in a logical server environment hence supporting a client server architecture.

Figure 2:
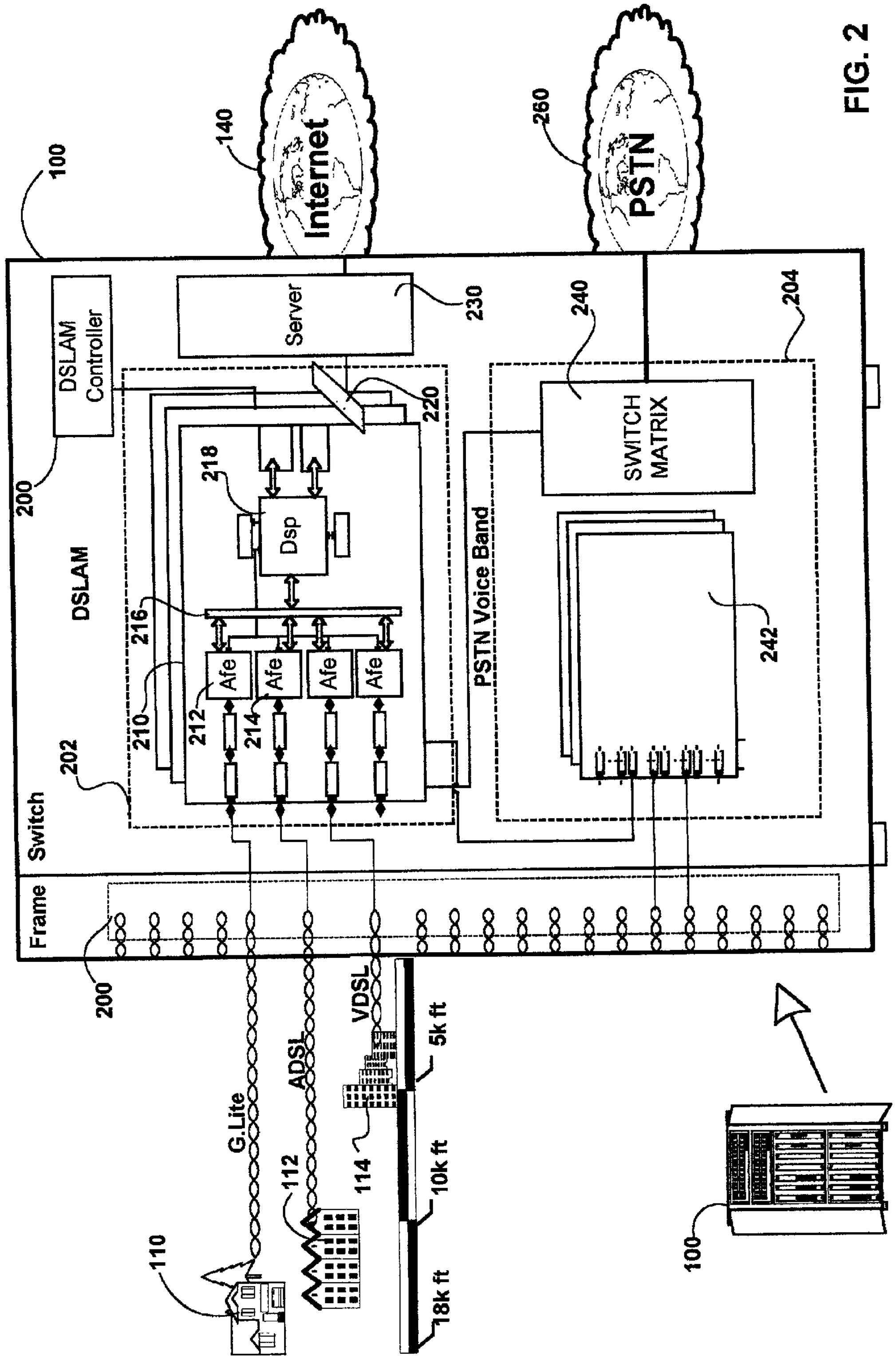
FIG. 2 depicts a more detailed view of a representative one of the central offices shown in FIG. 1 including both digital subscriber line access modules (DSLAMs) and PSTN voice band modules.

FIG. 2 depicts a more detailed view of a representative one of the central offices shown in FIG. 1 including both digital subscriber line access modules (DSLAMs) and PSTN voice band modules. The CO 100 includes subscriber line connections to subscribers 110–114. Each of these connections terminates in the frame room 200 of the CO. From this room connections are made for each subscriber line via splitters and hybrids to both a DSLAM 202 and to the voice band racks 204. The splitter shunts voice band communications to dedicated line cards, e.g. line card 242 or to a voice band modem pool (not shown). The splitter shunts higher frequency X-DSL communications on the subscriber line to a selected line card 210 within DSLAM 202. The line cards of the current invention are universal, meaning they can handle any current or evolving standard of X-DSL and may be upgraded on the fly to handle new standards.

Voice band call set up is controlled by a Telco switch matrix 240 such as SS7. This makes point-to-point connections to other subscribers for voice band communications. The X-DSL communications may be processed by a universal line card such as line card 212. That line card includes a plurality of AFE's e.g. 212–214 each capable of supporting a plurality of subscriber lines. The AFEs are coupled via a proprietary packet based bus 216 to a DSP 218 which is also capable of multi-protocol support for all subscriber lines to which the AFE's are coupled. The line card itself is coupled to a back-plane bus 220 which may in an embodiment of the invention be capable of offloading and transporting low latency X-DSL traffic between other DSPs for load balancing. Communications between AFE's and DSP(s) are packet based which allows a distributed architecture such as will be set forth in the following FIG. 3 to be implemented. Each of the DSLAM line cards operates under the control of a DSLAM controller 200 which handles global provisioning, e.g. allocation of subscriber lines to AFE and DSP resources. Once an X-DSL connection is established between the subscriber and a selected one of the DSLAM submodules, e.g. AFE and DSP the subscriber will be able to access any network to which the DSLAM is connected. In the example shown the DSLAM couples via server 230 with Internet 140.

Figure 3:
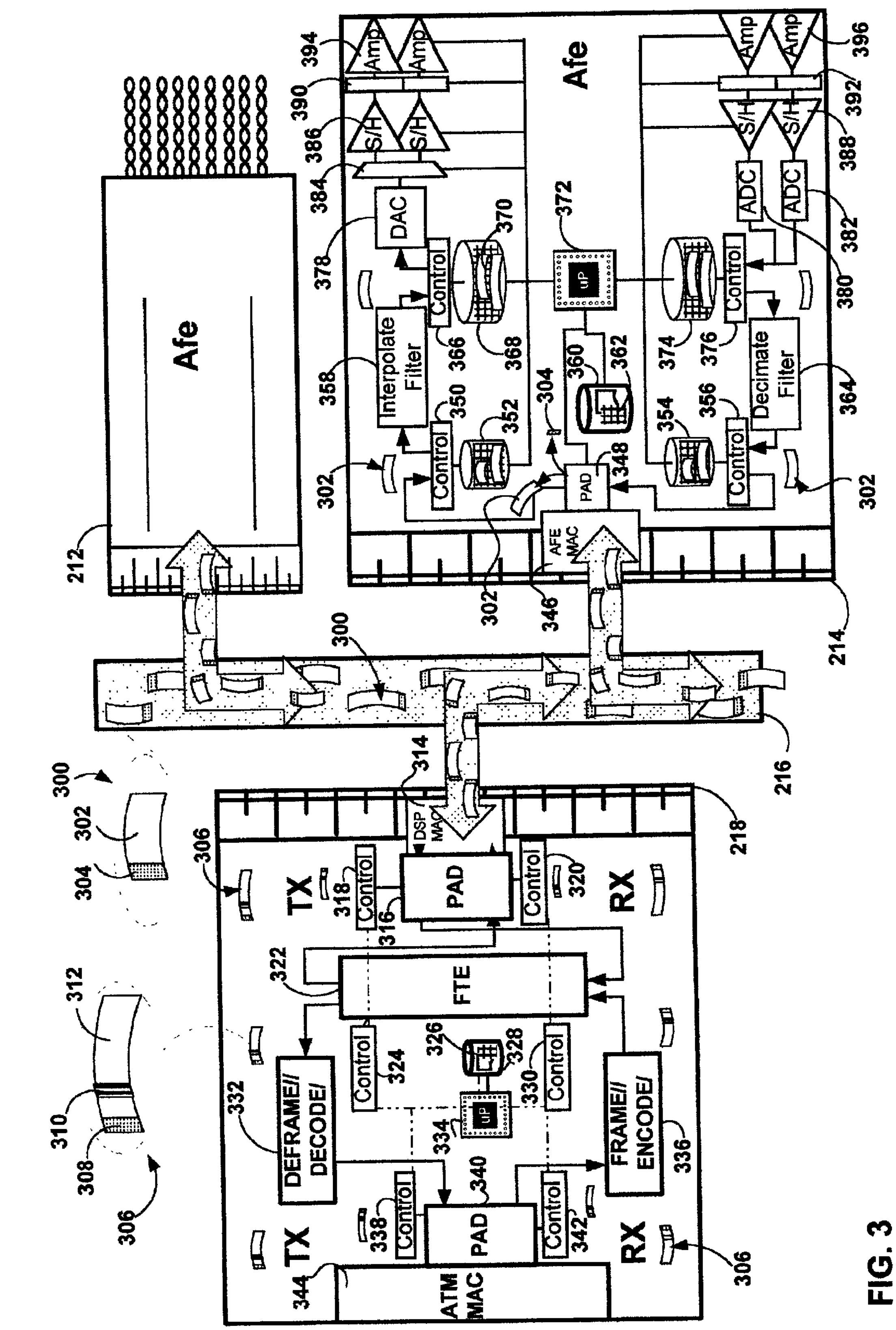
FIG. 3 is an expanded hardware view of one of the line cards in the central office shown in FIG. 2.

FIG. 3 is a chip level view of an embodiment of the invention in which multiple AFE's chips 212–214 connect with a DSP chip 218 across bus 216. They all may be mounted on the line card 210 shown in FIG. 2. Packets of raw data are shown being transported between the DSP and AFEs as well as within each DSP and AFE. Packet processing between the DSP and AFE chips involves transfer of bus packets 300. Packet processing within a DSP may involve device packets 306 (See FIG. 5). Packet processing within an AFE may involve raw data packets 302. These will be discussed in the following text.

These modules, AFE and DSP, may be found on a single universal line card, such as line card 210 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The DSP chip 218 includes an upstream and a downstream processing path with both discrete and shared components. Data for each of the channels is passed along either path in discrete packets the headers of which identify the corresponding channel and may additionally contain channel specific control instructions for various of the shared and discrete components along either the transmit or receive path.

On the upstream path, upstream packets containing digital data from various of the subscribers is received by the DSP medium access control (MAC) 314 which handles packet transfers to and from the DSP bus. The MAC couples with a packet assembler/disassembler (PAD) 316. The operation of the DSP PAD for upstream packets is managed by controller 318. For upstream packets, the PAD handles removal of the DSP bus packet header and insertion of the device header and control header which is part of the device packet 306. (See FIG. 5). The content of these headers is generated by the core processor 334 using information downloaded from the DSLAM controller 200 (See FIG. 2) as well as statistics such as gain tables gathered by the de-framer 332, or embedded operations channel communications from the subscriber side. These channel specific and control parameters 326 are stored in memory 328 which is coupled to the core processor. The PAD 316 embeds the required commands generated by the core processor in the header or control portions of the device packet header of the upstream data packets. The upstream packets may collectively include data from multiple channels each implementing various of the X-DSL protocols. Thus the header of each device packet identifies the channel corresponding with the data contained therein. Additionally, a control portion of the packet may include specific control instructions for any of the discrete or shared components which make up the upstream or downstream processing paths. In the embodiment shown, the Fourier transform engine (FTE) 322 is a component which is shared between the upstream and downstream paths. Thus, on the upstream path each upstream packet is delivered to the FTE for demodulation. The input controller 330 handles the mapping of data and the processing of the packets as it flows through FTE. The information in the header of the packet is used by the controller 330 to maintain the channel identity of the data as it is demodulated, to setup the FTE at the appropriate parameters for that channel, e.g. sample size, and to provide channel specific instructions for the demodulation of the data. The demodulated data is passed under the control of output controller 324 as a packet to the next component in the upstream path, i.e. the deframer and Reed Solomon decoder 332 for further processing. This component reads the next device packet and processes the data in it in accordance with the instructions or parameters in its header.

The demodulated, decoded and de-framed data is passed to the asynchronous transfer mode (ATM) PAD 340 operating under the control of controller 338. In the ATM PAD the device packet header is removed and the demodulated data contained therein is wrapped with an ATM header. The packet is then passed to the ATM MAC 344 for transmission of the ATM packet on the ATM network 140 (See FIGS. 1–2).

On the downstream path, downstream packets containing digital data destined for various subscribers is received by the ATM MAC 344 which handles transfers to and from the ATM network 140. The ATM MAC passes each received packet to the ATM PAD 340 where the ATM header is removed and the downstream device packet 306 is assembled. The operation of the ATM PAD for downstream packets is managed by controller 342. Using header content generated by the core processor 334 the PAD assemble data from the ATM network into channel specific packets each with their own header, data and control portions. The downstream packets are then passed to the Framer and Reed Solomon encoder 336 where they are processed in a manner consistent with the control and header information contained therein. The Framer downstream packets are then passed to the input of the FTE. The control 330 governs the multiplexing of these downstream packets which will be modulated by the FTE with the upstream packets which will be demodulated therein. Each downstream packet with the modulated data contained therein is then passed to the DSP PAD. In the DSP PAD the device packet header and control portions are removed, and a DSP bus header 304 is added. This header identifies the specific channel and may additionally identify the sending DSP, the target AFE, the packet length and such other information as may be needed to control the receipt and processing of the packet by the appropriate AFE. The packet is then passed to the DSP MAC for placement on the DSP bus 216 for transmission to the appropriate AFE.

FIG. 3 also shows a more detailed view of the processing of upstream and downstream packets within the AFE. In the embodiment of the invention shown, device packets are not utilized in the AFE. Instead, channel and protocol specific processing of each packet is implemented using control information for each channel stored in memory at session setup.

Downstream packets from the DSP are pulled off the bus 216 by the corresponding AFE MAC on the basis of information contained in the header portion of that packet. The packet is passed to AFE PAD 346 which removes the header 304 and sends it to the core processor 372. The core processor matches the information in the, header with channel control parameters 362 contained in memory 360 These control parameters may have been downloaded to the AFE at session setup. The raw data 302 portion of the downstream packet is passed to FIFO buffer 352 under the management of controller 350. Each channel has a memory mapped location in that buffer. The interpolator and filter 358 reads a fixed amount of data from each channel location in the FIFO buffer. The amount of data read varies for each channel depending on the bandwidth of the channel. The amount of data read during any given time interval is governed by the channel control parameters 362, discussed above. The interpolator upsamples the data and low pass filters it to reduce the noise introduced by the DSP. Implementing interpolation in the AFE as opposed to the DSP has the advantage of lowering the bandwidth requirements of the DSP bus 216. From the interpolator data is passed to the FIFO buffer 368 under the control of controller 366. The downstream packets 370 may increase in size as a result of the interpolation. The next module in the transmit pipeline is a DAC 378 which processes each channel in accordance with commands received from the core processor 372 using the control parameters downloaded to the control table 362 during channel setup. The analog output of the DAC is passed via analog mux 384 to a corresponding one of sample and hold devices 386. Each sample and hold is associated with a corresponding subscriber line. The sampled data is filtered in analog filters 390 and amplified by line amplifiers 394. The parameters for each of these devices, i.e. filter coefficients, amplifier gain etc. are controlled by the core processor using the above discussed control parameters 362. For example, where successive downstream packets carry downstream channels each of which implements different protocols, e.g. G.Lite, ADSL, and VDSL the sample rate of the analog mux 384 the filter parameters for the corresponding filter 390 and the gain of the corresponding analog amplifiers 394 will vary for each packet. This "on the fly" configurability allows a single downstream pipeline to be used for multiple concurrent protocols.

On the upstream path many of the same considerations apply. Individual subscriber lines couple to individual line amplifiers 396 through splitter and hybrids (not shown). Each channel is passed through analog filters 392, sample and hold modules 388 and dedicated ADC modules 380–382. As discussed above in connection with the downstream/transmit path, each of these components is configured on the fly for each new packet depending on the protocol associated with it. Each upstream packet is placed in a memory mapped location of FIFO memory 374 under the control of controller 376. From the controller fixed amounts of data for each channel, varying depending on the bandwidth of the channel, are processed by the decimator and filter module 364. The amount of data processed for each channel is determined in accordance with the parameters 362 stored in memory 360. Those parameters may be written to that table during the setup phase for each channel.

From the decimator and filter the raw data 302 is passed to FIFO buffer 354 which is controlled by controller 356. Scheduled amounts of this data are moved to PAD 348 during each bus interval. The PAD wraps the raw data in a DSP header with channel ID and other information which allows the receiving DSP to properly process it. The upstream packet is placed on the bus by the AFE MAC 346. A number of protocols may be implemented on the bus 216. In an embodiment of the invention the DSP operates as a bus master governing the pace of upstream and downstream packet transfer and the AFE utilization of the bus.

Figure 4:
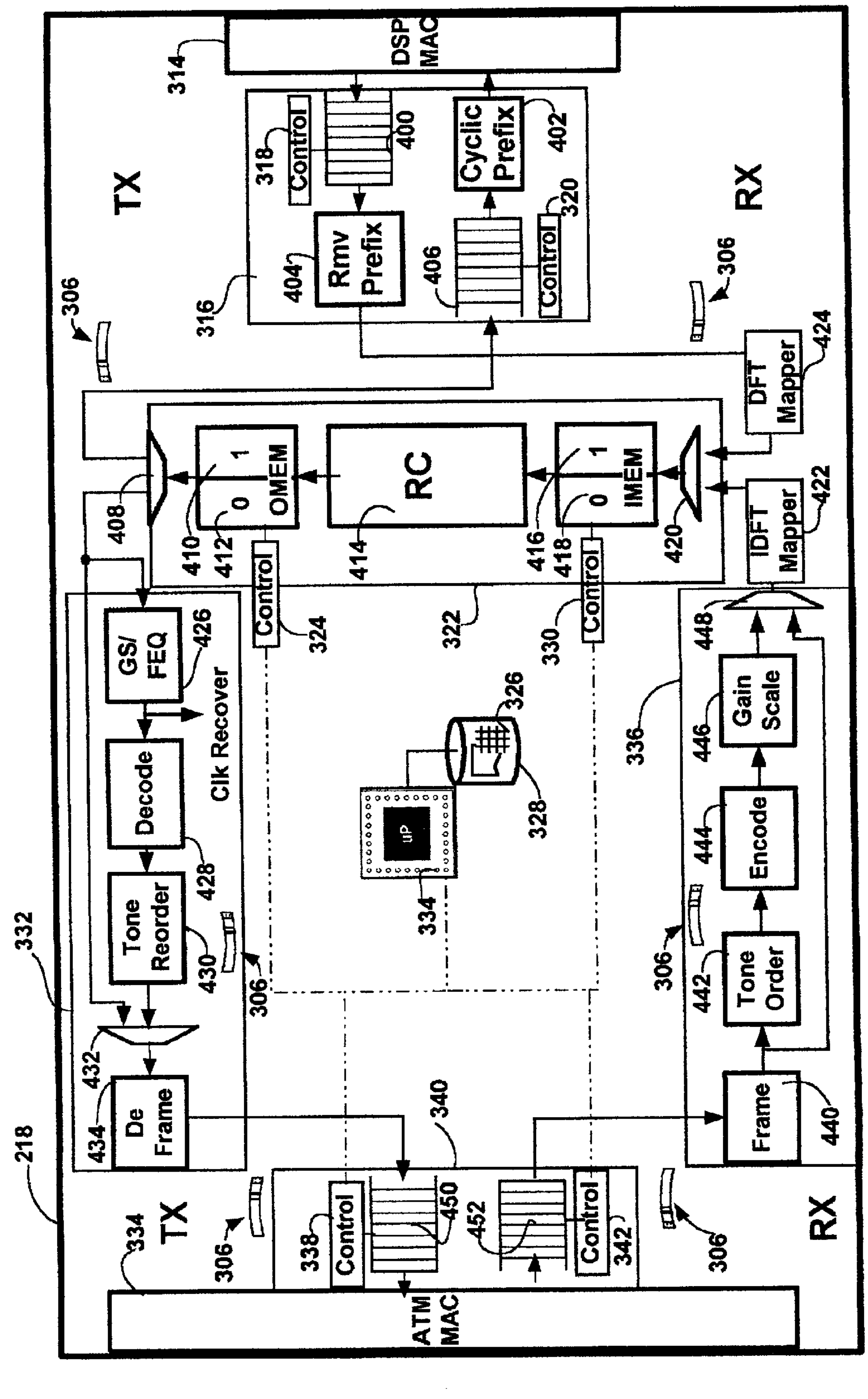
FIG. 4 is an expanded hardware view of the digital signal processor portion (DSP) of the line card shown in FIG. 3.

FIG. 4 is an expanded hardware view of the digital signal processor portion (DSP) of the line card shown in FIG. 3. Subcomponents of each of the DSP Pad 316, the FTE 322, the Deframer-decoder 332, the framer-encoder 336 and the AFE PAD 340 are shown.

On the upstream packet path, the AFE PAD includes a first-in-first-out (FIFO) buffer 400 where upstream packets from the AFEs are stored and a cyclic prefix remover 404. After removal of the cyclic prefix each packet is then passed to the DFT mapper 424. The DFT mapper is coupled to the input memory portion of the FTE via a multiplexer 420. The mapper handles writing of each sample set from a packet into the input memory in the appropriate order. The mapper may also handle such additional functions as time domain equalization (TEQ) filtering which is a digital process designed to normalize the impact of differences in channel response. The filter may be implemented as an FIR filter. The input memory comprises two portions 416 and 418.

Multiplexer 420 provides access to these memories. While one sample set, e.g. time or frequency domain data, is being written from the upstream or downstream data paths into one of the memories the contents of the other of the memories are written into the row and column component 412 of the FTE 322. Once the DFT is completed by the row and column component the frequency domain coefficients generated thereby are stored in either of portions 408–410 of the output memory of the FTE. These coefficients correspond with each of the DMT subcarriers. A multiplexer 408 handles the coupling of the output memory to either the next component of the upstream path, i.e. the deframer-decoder 332 or of the downstream path. Next on the upstream path, the device packet with header and data portions and optional control portion is passed to the remaining components of the upstream path. These include the gain scalar and optional forward error correction (FEQ) 424, the decoder 426, the tone re-orderer 428 and the deframer 432.

A multiplexer 430 couples the deframer input to either the tone reordered 428 or to the output memory of the FTE. Each of these components is individually configurable on a per channel basis using tables stored locally in registers within each component, or within memory 328. The access to these tables/registers is synchronized by the logic in each of the components which responds to header or control information in each upstream packet to alter tone ordering/re-ordering, gain scaling constants per-tone per-channel, and FEQ constants per-tone per-channel. The processor 334 may initialize all the registers. From the deframer packets are passed to the FIFO buffer 450 which is part of ATM PAD 340.

The core processor 334 has DMA access to the FIFO buffer 450 from which it gathers statistical information on each channel including gain tables, or gain table change requests from the subscriber as well as instructions in the embedded operations portion of the channel. Those tables 326 are stored by the core processor in memory 328. When a change in gain table for a particular channel is called for the core processor sends instructions regarding the change in the header of the device packet for that channel via PAD 316. The core processor 334 then writes the new gain table to a memory, e.g. memory 326, which can be accessed by the appropriate component, e.g. FTE 322 or Gain Scalar 426. As the corresponding device packet is received by the relevant component that component, e.g. the gain scalar applies the updated parameters to appropriately scale the data portion of the packet and all subsequent packets for that channel. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

On the downstream path a FIFO buffer 452 within the AFE PAD 340 holds incoming packets. These are passed to the components in the Framer and Encoder module 306 for processing. The components of that module include the framer 440, tone orderer 442, encoder 444 and gain scalar 446. They are coupled via a multiplexer 448 to the IDFT mapper 422. As was the case with the deframer, the framer will use protocol specific information associated with each of these channels to look for different frame and super frame boundaries. The tone orderer supports varying number of tones, bytes per tone and gain per tone for each of the X-DSL protocols. For example the number of tones for G.Lite is 128, for ADSL is 256 and for VDSL 2048. The number of bits to be extracted per tone is read from the tone-ordering table or register at the initiation of processing of each packet. For example as successive packets from channels implementing G.Lite, ADSL and VDSL pass through the DMT Tx engine the number of tones will vary from 128 for G.lite, to 256 for ADSL, to 2048 for VDSL. In the encoder 444 constellation mapping is performed based on the bit pattern of each packet. The output is a two dimensional signal constellation in the complex domain.

Next in the IDFT mapper each device packet is correlated with a channel and protocol and mapped into input memory via a connection provided by multiplexer 420. The mapping is in a row and column order. Next in the FTE, the complex symbols are modulated into carriers or tones in the row and column transform component 414 and placed in either portion 410 or 412 of output memory. The dimensions of the row and column transforms vary on a channel specific basis as shown in the following FIG. 11C. Next a packet with the memory contents, i.e. the tone sequence is passed as a packet via multiplexer 408 to the DSP FIFO buffer 406. This is part of DSP PAD 316. Individual packets are moved from this buffer to the cyclic prefix component 402 for the addition of the appropriate prefix/suffix. The cyclic prefix component is responsive to the device packet header which identifies the channel for which data is being processed. This can be correlated with the required prefix/suffix extensions for the protocol associated with the channel on the basis of parameters 326 stored in main memory 328 or within dedicated registers in the component. For example the cyclic extension for G.Lite is 16, for ADSL 32, and for VDSL 320.

This device architecture allows the DSP transmit and receive paths to be fabricated as independent modules or submodules which respond to packet header and or control information for processing of successive packets with different X-DSL protocols, e.g. a packet with ADSL sample data followed by a packet with VDSL sampled data. A mixture of different control techniques are used to control the behavior of the individual components of the DSP. The packet header may simply identify the channel. The component receiving the packet may then reference internal registers or downloaded tables such as table 326 to correlate the channel with a protocol and the protocol with the corresponding parameters with which the data portion of the packet is to be processed. Alternately the device packet may contain specific control information such as that associated with shutting down a channel, idling a channel, or shutting down the DSP.

Figure 5:
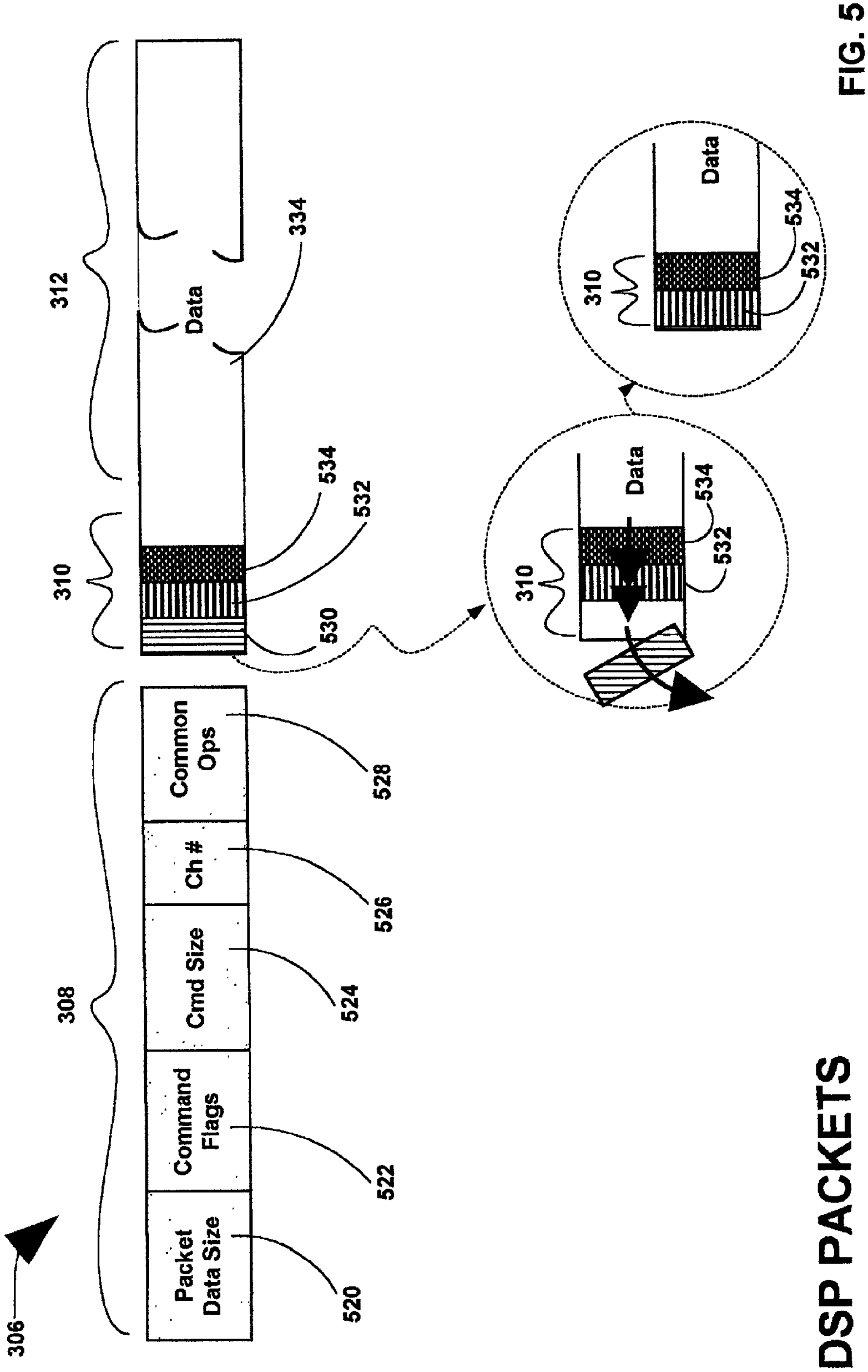
FIG. 5 shows the packet structure for passing data through and controlling the operation of various components within the DSP shown in FIG. 4.

FIG. 5 shows the device packet structure for passing data through and controlling the operation of various components within the DSP shown in FIG. 4. The device packets each include a header portion 308, a command portion 310 and a payload or data portion 312. In an embodiment of the invention the header is of a fixed length. The header in this embodiment of the invention includes five fields. Field 520 contains a value corresponding with the size of the packet. Field 526 identifies the channel associated with the packet. Field 528 indicates any common operations among modules to be performed on a channel, i.e. active, inactive, idle etc. Field 522 contains flags for each module in the associated path, i.e. transmit or receive, and a command size field 524. The command portion 310 may contain no command blocks or may contain command blocks for one or more of the modules or components on the transmit/receive path. Three command blocks 530, 532, 534 are shown.

The core processor 334 (See FIGS. 3–4) "talks" to selected modules indirectly through these packets and specifically via either the common ops field 528 or the command fields 520–524 thereof when the core processor has scheduling, setup, changeover, timing or other information for a selected module it passes the information to the module indirectly via headers for the associated channel together with the appropriate module. Thus the behavior of individual modules may be configured on the fly on a channel by channel basis.

As each module receives each packet it performs two operations on the header. An update of the packet data size is performed on every packet when the processes performed by the module, e.g. DFT or IDFT change the size of the payload. The module updates the value in field 320 with the new packet size. The other operation is only performed when the module/component receives a device packet in which its, the modules, unique flag bit in field 522 is set. If its flag bit is set, the module reads data starting from the start of the command portion 310 in an amount corresponding with the command size indicated in field 524. If the command is one to be executed on the current payload then the receiving module makes the changes and processes the payload data 534. If the command sequence is to be performed on a subsequent packet then the module logs the command and frame reference and executes it at the appropriate frame. After reading the command and processing the data, and before transferring the processed device packet to the next module in the queue the detecting module performs the following operations. It deletes its command information effectively by writing the packet out with the succeeding command blocks 532–534 moved from the second and third positions to the first and second positions within the command portion (See detailed views). Then the component updates both the command size in the command size field 524 as well as the packet data size 520.

Figure 6:
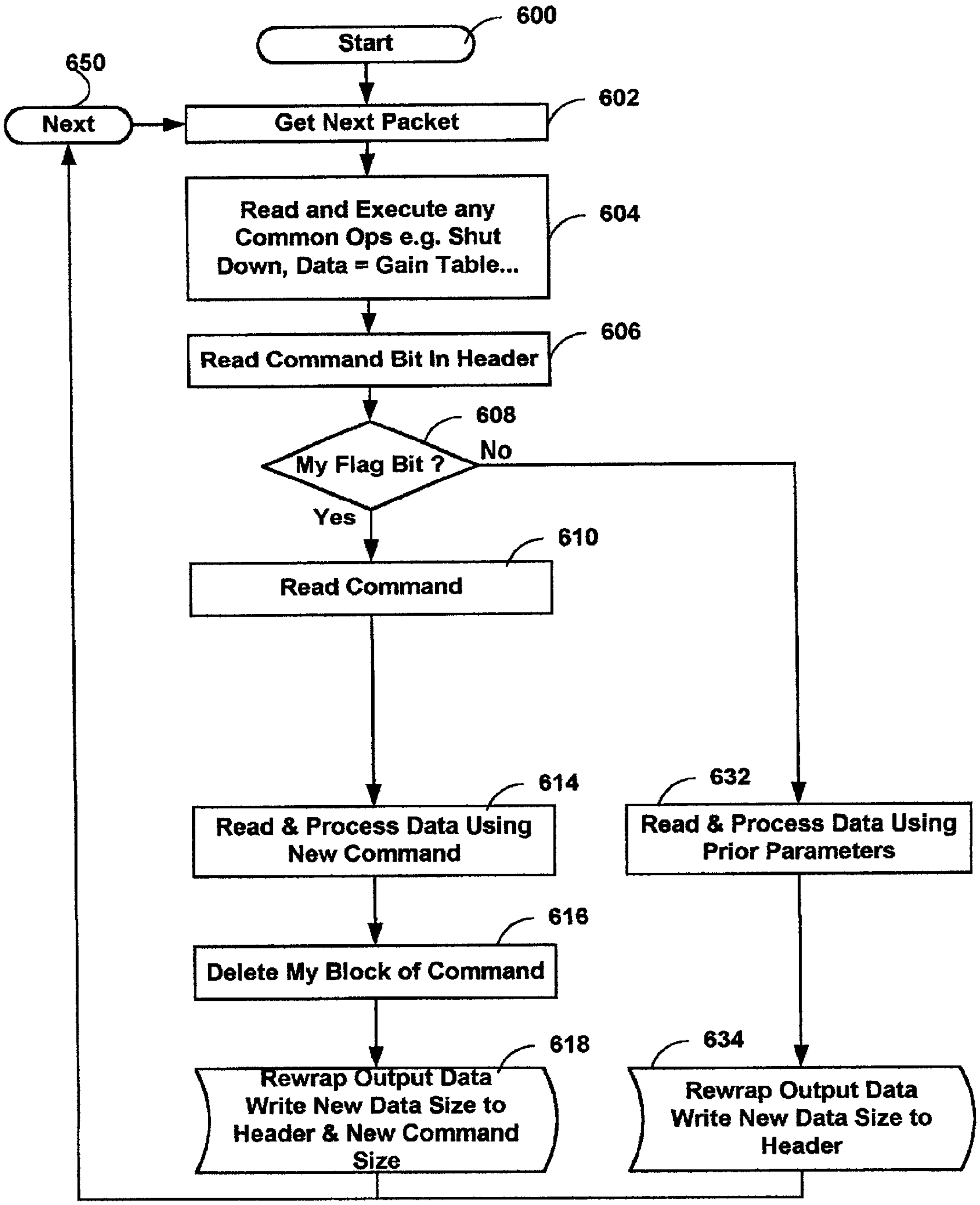
FIG. 6 is a process flow diagram showing the operation of various shared and dedicated components within the DSP in response to the receipt of a upstream or downstream packet.

FIG. 6 is a process flow diagram shoving the operation of various shared and dedicated components within the DSP in response to the receipt of upstream or downstream device packets 306. Each of the shared and dedicated components/modules responds to header and control information in the device packets to reconfigure its process parameters for processing of the data portion 312 of the device packet. Device packets may in alternate embodiments of the invention be implemented on either the DSP or the AFE should timing, scheduling, scalability etc. make it advantageous to do so. Processing begins in start bock 600 in which control is passed to process 602 for the receipt of the next packet. Next in process 604 the common ops field 528 (See FIG. 5) is read to see if there are any common ops in the header to be executed. Common ops include a state change for a channel, e.g. active->inactive/idle. Then in process 606 the command bit in command flag field 522 is read. If in decision process 608 a determination is made that the flag bit for the corresponding module is not set then that module executes process 632. In process 632 the device packet is processed using parameters previously associated with the channel in main memory 328 (See FIGS. 3–4) or in a memory/register associated with the component. These parameters may be downloaded or fixed part of memory. Next the module updates the header with the new data size in field 520 and passes the packet to the next submodule, module or FIFO buffer. Alternately, if in decision process 608 a determination is made that the flag bit for the module is set, then control is passed to process 610 in which the command is read. Control then passes to processes 614–618. In process 614 the command is acted on or stored for action on a later packet. This later feature permits synchronization with other modules. Next in process 616 the command for the component is deleted from the command block and any remaining commands re-written, e.g. moved forward in the command portion 310. Then in process 618 the updated device packet with processed data and updated header information, e.g. packet size, is assembled and passed to the next component. This approach has the advantage of avoiding detailed timing, synchronization and control of the individual modules. Each component may be individually configured using either in packet or out of packet control techniques.

FTE

The following FIGS. 8–16 and accompanying text set forth in greater detail the FTE 322 shown in FIGS. 3–4. That engine allows pipelined processing of both DFT and IDFT transforms for serial steams of upstream and downstream packets in a variety of X-DSL protocols. A particular advantage of the transform engine is that, as compared with prior art approaches (See FIG. 7) is that throughput time is reduced. Throughput time is the elapsed time between receipt of the first sample of a sample set and the transformation of the last coefficient resulting from the transform.

Figure 7:
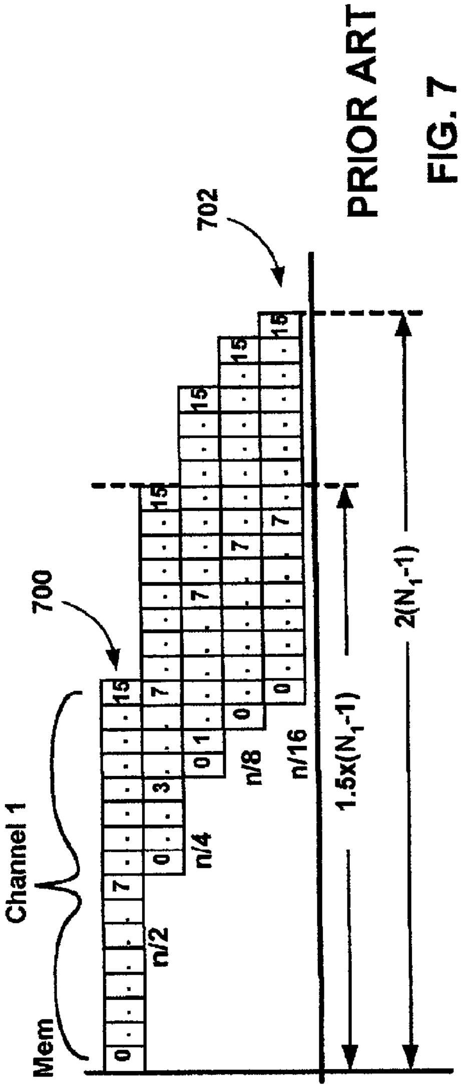
FIG. 7 is a data flow diagram showing the time required by Prior Art Fourier transform processors to process a sample.

FIG. 7. is a data flow diagram showing the approximate time required by Prior Art Fourier transform processors to process a sample. FIG. 7 corresponds with a cascade approach in which a given sample set 700 is subject to consecutive radix 2 transforms until a final set of coefficients 702 is generated. The total throughput time $2(N_1-1)$ is expressed in terms of the number of samples $N_1-1$ in the input sample set.

Figure 8:
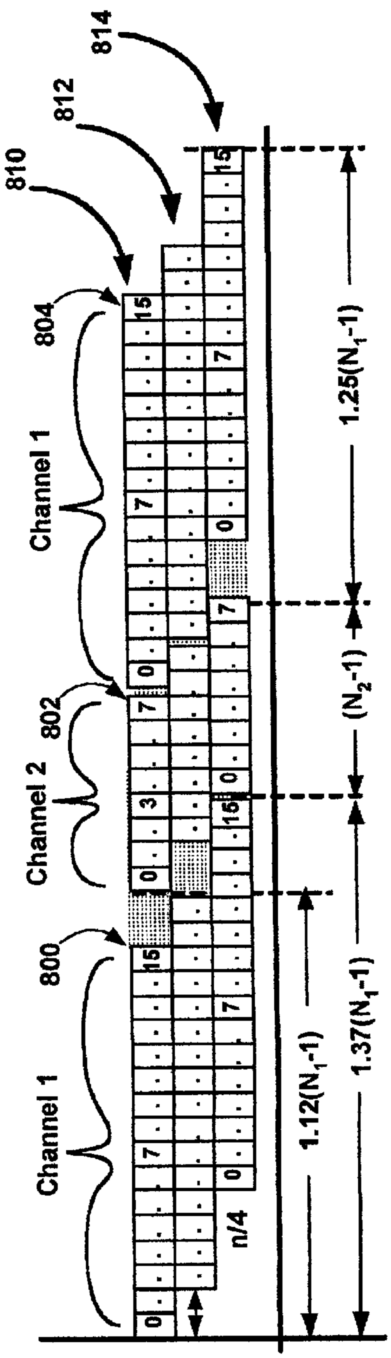
FIG. 8 is a data flow diagram showing the reduced throughput time and data processing flexibility of the Fourier transform processor of the current invention.

FIG. 8 is a data flow diagram showing the reduced throughput time and data processing flexibility of the Fourier transform engine 322 of the current invention. The total throughput time for a sample 800 to pass from memory 810, through the row transform 812 and column transform 814 is $1.37(N_1-1)$ where $N_1-1$ is the size of the input sample set. Where multiple sample, e.g. 802 and 804 of varying sizes are pipelined through the FTE additional advantages over prior art implementations are evident. In FIG. 8 the next sample set 802 can begin processing after a delay of 1.12 $(N_{1\_}1)$ as compared with an estimated delay of $1.5(N_{1\_}1)$ for the prior art case shown in FIG. 7. Thus, beyond flexibility, the FTE of the current invention exhibits a significant improvement in throughput time over prior art approaches. The manner in which these throughput improvements are accomplished is set forth in the following FIGS. 9–16.

The Two Dimensional DFT/IDFT

The discrete Fourier Transform (DFT) is the counterpart of the Fourier transform in the discrete time domain. Given a sequence of N samples f(n), indexed by n=0. N−1, the Discrete Fourier Transform (DFT) is defined as X(k), where k=0. N−1, and $$W_N = e^{-j\frac{2n}{N}}.$$

$$X(k) = \sum_{n=0}^{N-1} x(n) W_N^{nk}$$

X(k) are often called the 'Fourier Coefficients' or 'Harmonics'.

The sequence x(n) can be calculated from X(k) using the Inverse Discrete Fourier Transform (IDFT):

$$x(n) = \frac{1}{N}\sum_{k=0}^{N-1} X(k)W_N^{-nk}$$

In general, both x(n) and X(k) are complex. Conventionally, the sequences x(n) and X(k) are referred to as 'time domain' data and 'frequency domain' data respectively. Of course there is no reason why the samples in x(n) need be samples of a time dependant signal. For example, they could be spatial image samples.

For the IDFT the following Equations 1A–B apply.

$$x(n_c, n_r) = \frac{1}{4096}\sum_{k_r=0}^{63}\left(\sum_{k_c=0}^{63} X(k_c, k_r)W_{64}^{-n_c k_c}\right)W_{4096}^{-n_c k_r}W_{64}^{-n_r k_r} \quad \text{Equation 1A}$$

$$x(n_1, n_2) = \sum_{k_2=0}^{15}\left(\sum_{k_1=0}^{3} X(k_1, k_2)W_4^{-n_1 k_1}\right)W_{64}^{-n_1 k_2}W_{16}^{-n_2 k_2} \quad \text{Equation 1B}$$

Equation 1A is the general 2D equation for performing and IDFT transform on a 4k sample set. The bracketed portion of Equation 1A is a 64 point transform. The computation of the 64 point transform and the subsequent multiplication by the 4096 twiddle factors takes place in the sliced radix and remaining row portion of the RC engine. The rest of the computation in Equation 1A takes place in the column portion of the RC engine.

Equation 1B expresses the bracketed portion of Equation 1A as yet another 2D transform. The bracketed summation in Equation 1B is that which is computed using the Sliced Radix of order 4 in the row portion of the RC transform component 414. To reduce the interval after which column processing can begin a partial solution for Equation 1A is generated for all samples in row order. As each row is processed in accordance with Equation 1B the solutions are limited to 1/R of the possible solutions by requiring that $n_1$ is fixed at one selected value (Slice) and $n_2$ varied. Then another pass through all the rows in Equation 1A is generated only this time the Slice is incremented to the next value of $n_1$. This process is repeated until all slices have been transformed and a complete solution set of time/frequency/other domain coefficients has been stored in output memory. A visual representation of this ordering is set forth in FIG. 12B.

The DFT expressed as a two dimensional transform is set forth in the following Equations 2A–B for N=4096 and with $N_1$=64 and $N_2$=64.

$$x(k_c, k_r) = \sum_{n_r=0}^{63}\left(\sum_{n_c=0}^{63} X(k_c, k_r)W_{64}^{n_c k_c}\right)W_{4096}^{n_r k_c}W_{64}^{n_r k_r} \quad \text{Equation 2A}$$

$$x(k_1, k_2) = \sum_{n_2=0}^{15}\left(\sum_{n_1=0}^{3} X(n_1, n_2)W_4^{n_1 k_1}\right)W_{64}^{n_2 k_1}W_{16}^{n_2 k_2} \quad \text{Equation 2B}$$

Equation 2A is the general 2D equation for performing and DFT transform on a 4k complex sample set. Where, as is the case in X-DSL the time domain inputs are all real the sample set is first converted into a complex array with ½ the number of samples. The bracketed portion of Equation 2A is a 64 point transform. The computation of the 64 point transform and the subsequent multiplication by the 4096 twiddle factors takes place in the sliced radix and remaining row portion of the RC engine. The rest of the computation in Equation 2A takes place in the column portion of the RC engine.

Equation 2B expresses the bracketed portion of Equation 2A as yet another 2D transform. The bracketed summation in Equation 2B is that which is computed using the Sliced Radix of order 4 in the row portion of the RC transform component 414. To reduce the interval after which column processing can begin a partial solution for Equation 2A is generated for all samples in row order. As each row is processed in accordance with Equation 2B the solutions are limited to 1/R of the possible solutions by requiring that $k_1$ is fixed at one selected value (Slice) and $k_2$ varied. Then another pass through all the rows in Equation 1A is generated only this time the Slice is incremented to the next value of $k_1$. This process is repeated until all slices have been transformed and a complete solution set of time/frequency/other domain coefficients has been stored in output memory. Where the input is real and it was compressed into a complex array, a post processing step is required to obtain the solution set. A visual representation of this ordering is set forth in FIG. 12A.

A complete discussion of this two dimensional transform is found in the reference entitled "*DFT/FFT and Convolution Algorithms*" authored by C. S. Burrus and T. W. Parks and published in 1985 by Wiley-Interscience Publication a division of John Wiley & Sons with an ISBN number of 0-471-81932-8 which reference is incorporated by reference as if fully set forth herein.

FIGS. 9AB are isometric representations of the two dimensional implementation of the Fourier transform for the DFT and IDFT respectively. For the DFT an 4k input sample of real inputs is compressed into a 2k complex sample set 800. The set is mapped into input memory as an array of 32 columns and 64 rows. Next a partial row transform is performed on each row of the array. This partial radix "R" transform is performed on those vectors 810 which contribute to a solution of the coefficients of the first column 822 and is not performed for those vectors 812 which do not. The selection of samples from the first and subsequent rows is governed by the magnitude of "R". R is chosen to sliced the range of sample sets that will be processed into manageable portions. Once R is selected the spacing 806–808 between samples within a row can be determined. The spacing is substantially equal to the number of columns, e.g. 32 divided by R. Once the partial row transform is performed the first column 822 of the intermediate transform set 802 has been generated. It is stored in a row and column memory. The time required to generate the first and subsequent columns is significantly less time than required by prior art approaches in which all complex coefficients of a row are calculated before column calculation. Next the column is subject to a complete transform on all vectors 814. This transform produces the first column of output coefficients 824. Processing is completed on all input rows, and repeated through all remaining complex solution sets corresponding with vectors 812.

FIG. 9B shows similar processing for the IDFT. The set is mapped into input memory as an array of 64 columns and 64 rows. For the IDFT a 4k input sample with Hermetian symmetry is treated as a sample set 33 rows rather than 64 due to the property of the Hermetian which characterizes all rows 866 beyond one below the middle row to be characterized as complex conjugates of a corresponding row in the top half of the input array. If the inverse Fourier Transform results in real valued sequence then the resulting 2-D map has the following Hermetian symmetry: If we denote the elements of row i as $R_1(j)$ where j=0, . . . , C−1 then:

$$R_1(j)=R^*_{R-i}(C-j) \text{ for i } 1, \ldots, R/2-1, R/2+1, R-1$$

Therefore $R_0(j)$ has the same structure as the original sequence x(k) and $R_{N/2}(i)$ is a mirror reversed conjugate sequence with $R_{N/2}(j)=R^*_{N/2}(C-j)$ for j=0, . . . , N/2−1. Thus a transform of the top half of the rows is followed by a conjugation operation to expand the number of rows output to RC memory back to their original value. No loss of accuracy and a considerable savings in time is a result of taking advantage of this special case, unique to DMT communication protocols. Next a partial row transform is performed on each row of the array. This partial radix "R" transform is performed on those vectors 860 which contribute to a solution of the coefficients of the first column 872 and is not performed for those vectors 862 which do not. The selection of samples from the first and subsequent rows is governed by the magnitude of "R" as discussed above. Once R is selected the spacing 856–858 between samples within a row can be determined. Once the partial row transform is performed the first column 872 of the intermediate transform set 852 has been generated. It is stored in a row and column memory. The time required to generate the first and subsequent columns is significantly less time than required by prior art approaches in which all complex coefficients of a row are calculated before column calculation. Next the column is subject to a complete transform on all vectors 864. This transform produces the first column of output coefficients 874. Processing is completed on all input rows, and repeated through all remaining complex solution sets corresponding with vectors 862.

Figure 10:
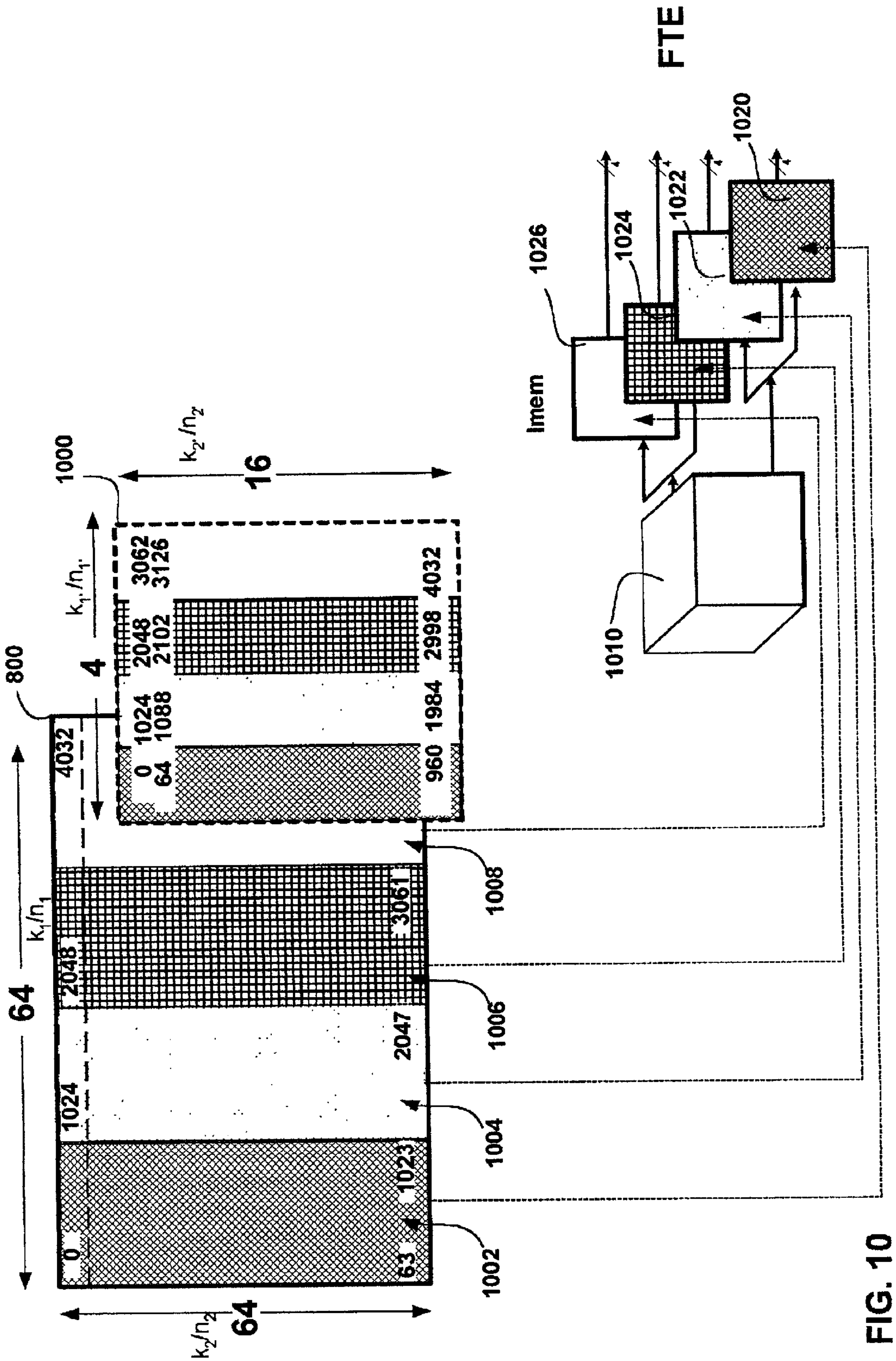
FIG. 10 shows the two dimensional folding of the input sample and the concurrent mapping of the sample to the input memory of the Fourier transform invention of an embodiment of the current invention.

FIG. 10 shows the two dimensional folding of the input sample and the concurrent mapping of the sample to the input memory of the Fourier transform invention of an embodiment of the current invention. The example shown is for a sliced radix order "4" although other higher orders for the sliced radix would also reduce the throughput time, albeit at a cost of more memory, adders, multipliers, etc. A 4k input array 800 is sliced into 4 quadrants 1002, 1004, 1006, and 1008. These quadrants are stored in separate memories 1020, 1022, 1024, 1026 which are part of either of the portions 416–418 of the input memory of the FTE shown in FIG. 4. This latter feature allows parallel writes from each of the memories to the four parallel inputs of the sliced radix 4 component which forms the input of the row and column transform component 414 of the FTE (See FIG. 4). The manner in which samples are written from the memories to the sliced radix is best visualized as a further decomposition of each row in array 800 into a second two dimensional array 1000 with a number of columns equal to the order of the sliced radix input. The control of the writing to memories is accomplished by a mapper 1010 corresponding with either of the IDFT or DFT mappers 422–424 respectively (See FIG. 4).

FIGS. 11A–C show the data structures which may be downloaded to the DSP to govern its response to various of the X-DSL protocols. FIG. 11A shows transmit parameter s in the DSP which may be regulated on a channel by channel basis on the transmit path of a DSP via values in the header or control portions of the device packets 306 discussed above in FIGS. 4–6. FIG. 11B shows corresponding parameters for the receive path of the DSP. FIG. 11C shows row and column dimensions for transforms performed on various of the standard X-DSL sample sets within the FTE 322 shown in FIGS. 3–4.

Figure 12A:
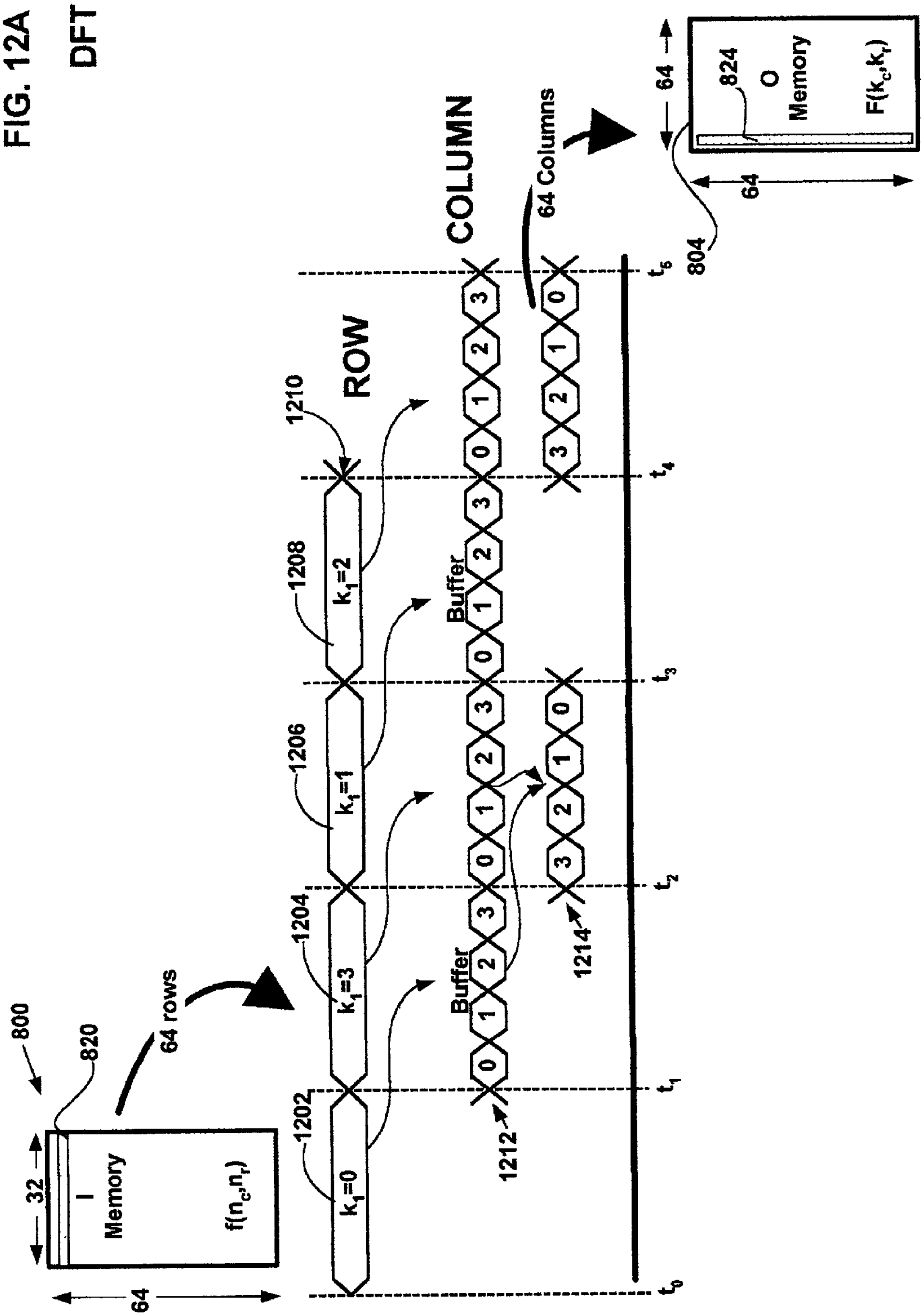
FIGS. 12AB are timing diagrams showing the timing associated with various portions of the Fourier transform circuit for both the DFT and the IDFT respectively.

FIG. 12A is a timing diagram showing the timing associated with the row and column transforms of the DFT. A 4k real array of time domain samples is reduced to a 2k complex array. Each row, e.g. row 820 of the array is subject to a sliced radix transform which results in a solution to a slice of the inner nested summation. This technique was discussed above in connection with Equation 1 above. In the embodiment shown the sliced radix is order "4". In the example shown in FIG. 12A the time domain sample set 800 (See FIG. 8) is folded into a two dimensional array of 32 columns and 64 rows. The row engines output comprises 4 sequential transforms 1202, 1204, 1206 and 1208 of a slice of each of the row transforms. Although collectively these are equivalent in processing steps to a full radix solution they have the visible benefit of allowing column processing to begin at time $t_1$. If the radix input to the row engine fully completed all possible vectors, i.e. the set of 16 complex solutions for each of the 4 samples presented to it, then processing of the columns could not begin until $t_4$. As indicated in FIG. 12A the ordering of the slices is important as well. For the DFT the $0^{th}$ and $3^{rd}$ sliced outputs and the $1^{st}$ and $2^{nd}$ sliced outputs of the row engine are executed by the column engine during a first stage of operation shown in row 1212. The column transform of the $0^{th}$ slice is buffered and combined with the column transform of the $3^{rd}$ slice and the $1^{st}$ slice is buffered and combined with the column transform of the $2^{nd}$ slice during the second stage 1214 of processing within the column engine. The output is then complex conjugated and the frequency domain coefficients of the first column 824 of the solution set 804 are placed in output memory of the FTE. On the first slice 1202 of all rows in the input sample set, ¼ of the columns in the output array 804 are generated. After 3 more passes 1204, 1206, 1208 through the input array the row and column transform is complete.

Figure 12B:
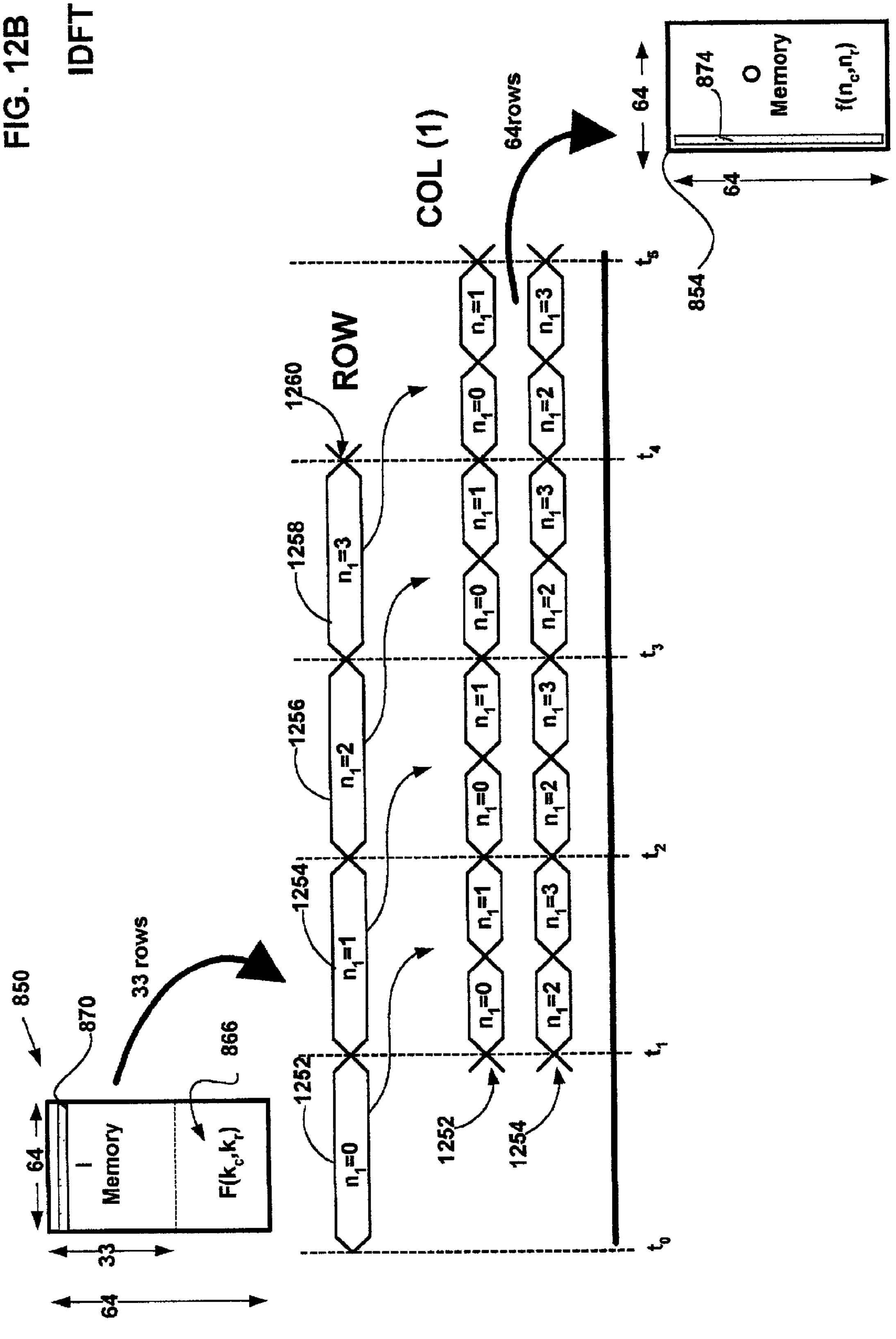

FIG. 12B is a timing diagrams showing the timing associated with the row and column transforms of the IDFT. An input exhibiting hermetian symmetry is shown. The input array of frequency domain samples 850 is folded into a two dimensional array with 64 columns and after removing the lower conjugates 866 has 33 rows remaining. Each row, e.g. row 870 of the array is subject to a sliced radix transform which results in a solution to a slice of the inner nested summation shown in Equation 2 above. In the embodiment shown, the sliced radix is order "4". The row engines output comprises 4 sequential transforms 1252, 1254, 1256 and 1258 of a slice of each of the row transforms. Although collectively these are equivalent in processing steps to a full radix solution they have the visible benefit of allowing column processing to begin at time $t_1$. If the radix input to the row engine fully completed all possible vectors, i.e. the set of 16 complex solutions for each of the 4 samples presented to it, then processing of the columns could not begin until $t_4$. As indicated in FIG. 12B the ordering of the slices is important as well. Two parallel column transforms are performed on slices 0,1 and 2,3 as shown on lines 1252 and 1254 respectively. The transformed output of time domain samples is written to memory starting with the first column 874. On the first slice 1252 of all rows in the input sample set, ¼ of the columns in the output array 854 are generated. After 3 more passes 1254, 1256, 1258 through the input array the row and column transform is complete.

Figure 13A:
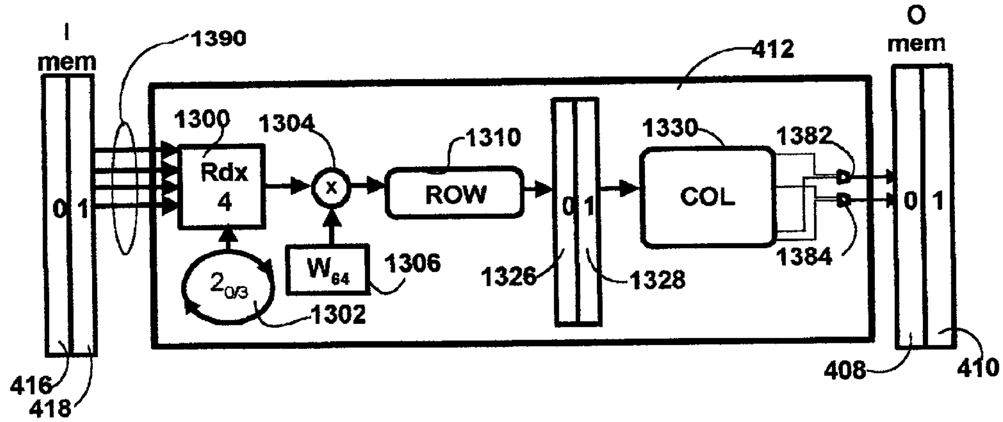
FIGS. 13AB are hardware block diagrams showing alternate embodiments of the Fourier transform processor of the current invention.

FIGS. 13AB are hardware block diagrams showing alternate embodiments of the Fourier transform processor of the current invention. In the embodiment shown in FIG. 13A a single sliced radix module is shown. That module includes parallel input radix processor 1300, complex scaler 1302, multiplier 1304 and twiddle factor generator 1306. The sliced radix module accepts order "R" parallel inputs from the input sample delivery circuit which in this case includes input memory 416/418 and more generally the entire downstream/transmit path or the upstream/receive path discussed above in connection with FIGS. 3–4. In alternate embodiments of the invention where the FTE may be implemented on one or the other of the upstream or downstream X-DSL paths. In still other embodiments of the invention the FTE may be used in fields other than communications such as medical imaging, pattern recognition, signal analysis, etc. In all cases the phrase input sample delivery circuit applies to whatever circuit, hardware or software which delivers sample sets to the FTE. The sliced radix module couples to the input of the row and column circuit. In the embodiment shown that circuit comprises the remainder of the row transform 1310, row/column memory 1326–1328 column transform 1330, and switched outputs 1382–1384 The coefficients, e.g time or frequency domain are passed to output memories 408 or 410. For a sliced radix "R=4" module at the input, four passes through the rows in the input memory are required to generate a complete row and column transform at the output. This results from the fact that as discussed above, only one set of 4 of the possible 16 complex coefficients or vectors is generated by the sliced radix module on each pass through the input array.

Figure 13B:
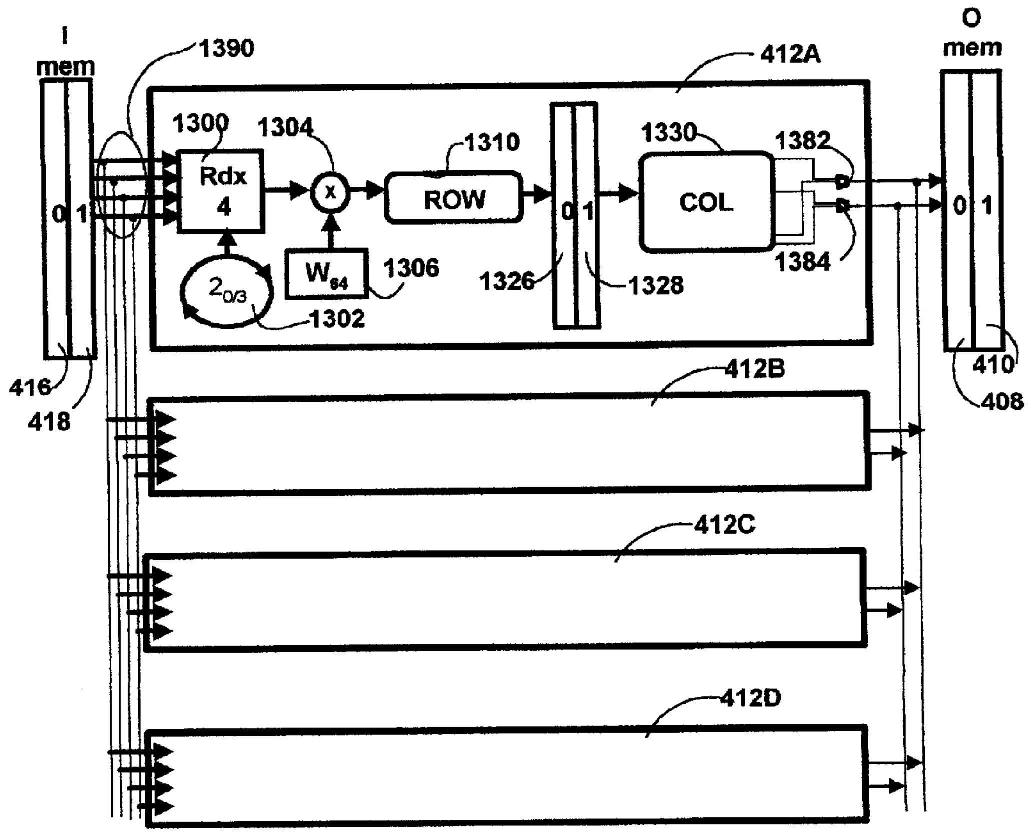
FIGS. 13CD are expanded hardware block diagrams of the Fourier transform processor shown in FIG. 13A during the processing of a DFT and an IDFT respectively.

In the embodiment shown in FIG. 13B four RC modules 412A–D are shown. Each has a sliced radix module coupled to the input sample delivery circuit on the input and to a corresponding row and column circuit on the output. The use of the 4 sliced radix modules in a number equal to an order R=4 of the sliced radix results in the requirement of only one pass through in the input array to generate the entire transformed output in memory 408/410.

Figure 13C:
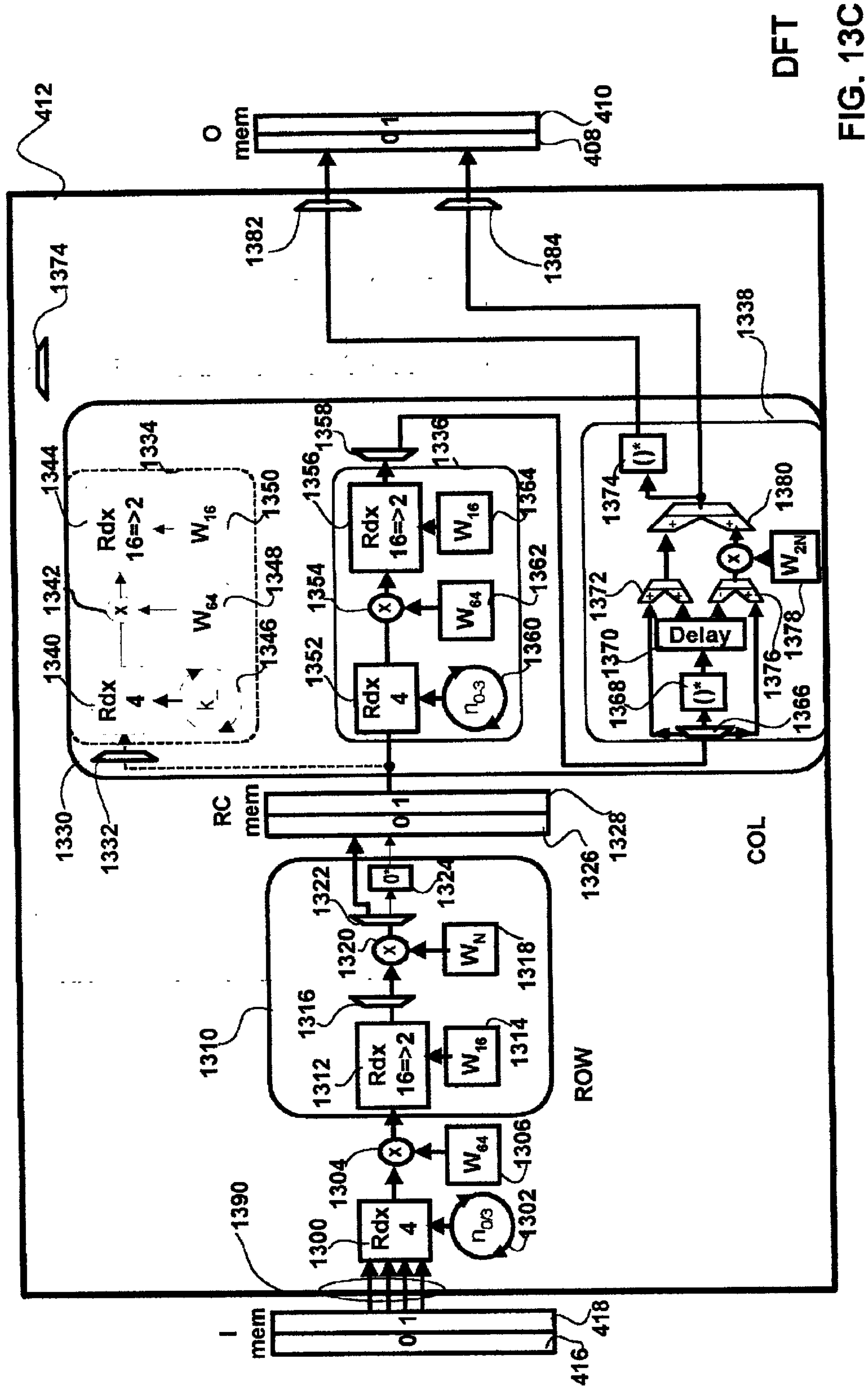

FIGS. 13CD are expanded hardware block diagrams of the Fourier transform processor shown in FIG. 13A during the processing of a DFT and an IDFT respectively. All shared and dedicated circuits are shown in the row and column circuit. Circuits which are not active during either transform are shown in dashed lines of lesser width. Circuits which are active during either transform are shown with solid and wider lines.

FIG. 13C shows the FTE configuration for an DFT. In the example shown the time domain sample set of all real values was compressed by half into an array of complex values. At the output a complex conjugator will be used to expand the column transform output of frequency domain coefficients back to the size of the original sample. The sliced radix circuit discussed above provides the first processing stage of the RC engine. The sliced radix circuit has 4 parallel inputs generally 1390 which correspond in number with the order of the radix. Its output is coupled to the input of a remaining row portion 1310 of the row transform. In the example shown that module 1310 includes a variable order radix 1312 with an order variable between Rmax and Rmin. In the example shown Rmax=16 and Rmin=2. That variable order radix couples with the Twiddle factor generator 1314. The transformed output of the variable order radix is passed via switch 1316 to multiplier 1320. The multiplier multiplies twiddle factors from generator 1318 times the input and passes these via switch 1322 to either of RC memories 1326–1328.

The output from RC memory is passed to the first stage 1336 of two column transform stages 1336–1338. In the first stage a radix "R" 1352 and associated twiddle driver 1360 provides an output to multiplier 1354 The output is scaled by the multiplier with a twiddle factor 1362 and the resultant is passed to the input of a variable order radix 1356 with an order also variable between Rmax and Rmin. In the example shown Rmax=16 and Rmin=2. That variable order radix couples with the associated twiddle factor generator 1364. The transformed output of the variable order radix is passed via switch 1358 to the second stage module 1338. Within the second stage module switch 1366 couples the input to the positive input of summer 1372 together with the positive input of differencer 1376 or to complex conjugator 1370. The output of the conjugator is stored in a delay buffer 1370. The output of the delay buffer provides the other inputs to the summer and differencer. The timing of the switch 1366 during processing of the column portion of the two dimensional DFT has been discussed above in connection with FIG. 12A. The output of the differencer is scaled using a input from twiddle generator 1378. The scaled output provides one of the inputs to summer 1380. The other input to that summer is the output of the first stage summer 1372. The output of the second stage summer is coupled via switch 1384 to either of output memories 408–410 (See FIG. 4). A second input to output memory is provided by complex conjugator which is also coupled to the output of the second stage summer. This injects hermetian symmetry into the frequency domain coefficients of the output sample set stored in output memory.

Figure 13D:
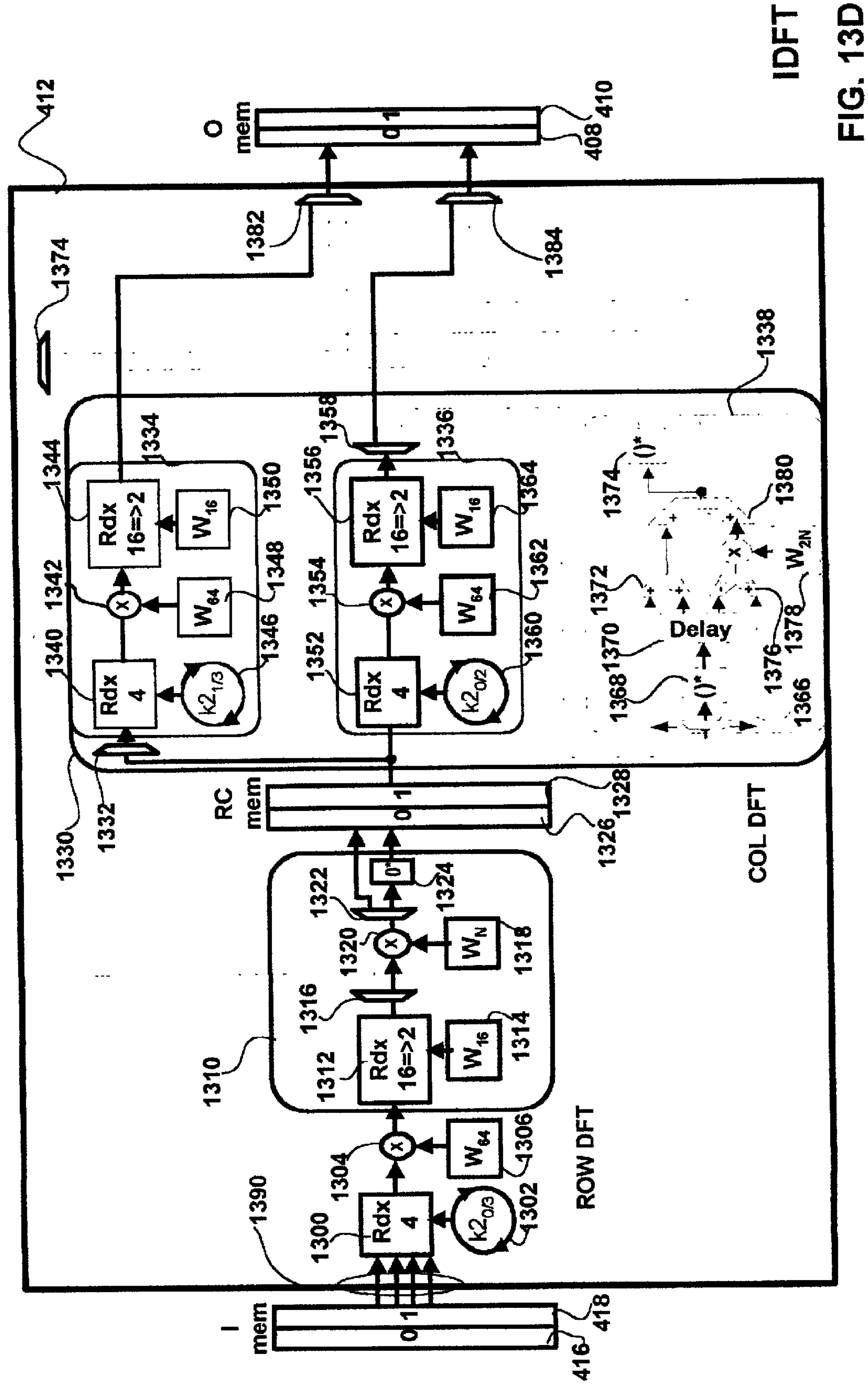

FIG. 13D shows the FTE configuration for an IDFT. In the example shown the frequency domain sample set which exhibits hermetian symmetry is subject to row reduction to avoid transforming rows which are merely complex conjugates. These rows will be regenerated after the row transformation. The sliced radix circuit discussed above provides the first processing stage of the RC engine. The sliced radix circuit has 4 parallel inputs generally 1390 which correspond in number with the order of the radix. Its output is coupled to the input of a remaining row portion 1310 of the row transform as discussed above in connection with the DFT circuit configuration. The processing of the row is substantially similar to that discussed above in FIG. 13C, with one exception, the output of the row transform is expanded by supplying both the direct output from switch 1322 and the conjugated output from conjugator 1324 to RC memory.

The output from RC memory is passed to the first stage 1336 of the column transform as discussed above in connection with the DMT. The output from the RC memory is also provided via switch 1332 to a second first stage module 1334 which performs similarly to the first albeit with different slices to compute (See FIG. 12B). The outputs of the first stage and the second first stage are supplied to output memory via switches 1382–1384 respectively. This real valued time domain coefficients are stored in either of output memories 408/410.

Figure 14B:
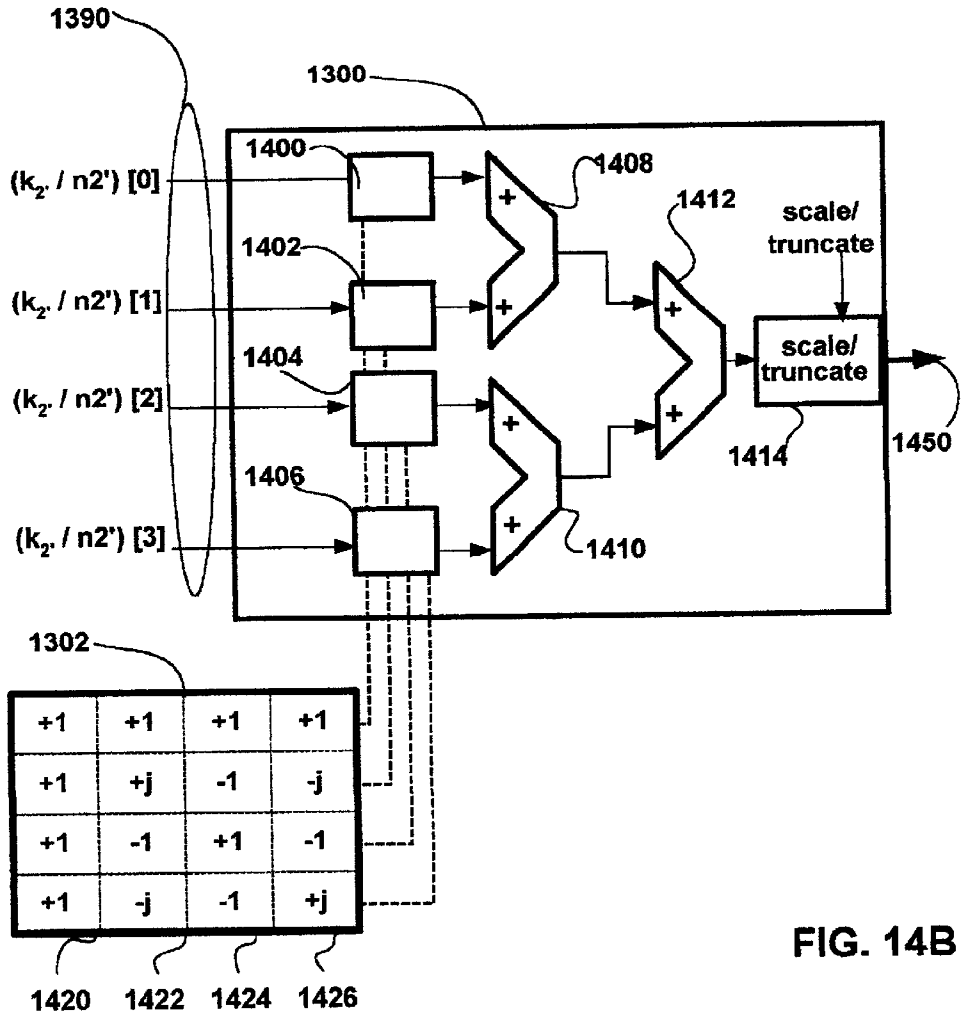
FIG. 14B is a butterfly representation of the sliced radix processor shown in FIG. 14A.
Figure 14A:
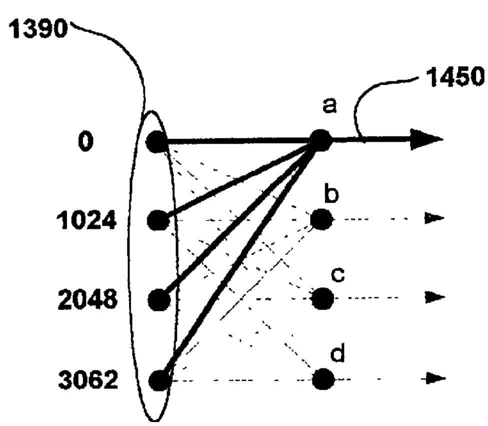
FIGS. 14A is an expanded hardware block diagrams of the sliced radix processor portion of the Fourier transform engine shown in FIGS. 13CD.

FIGS. 14A is an expanded hardware block diagrams of the sliced radix processor portion of the Fourier transform engine shown in FIGS. 13CD. The parallel input radix processor 1300, and complex scaler 1302 are shown (See FIG. 13). The order of the radix in the example shown is "R". Thus the unit has 4 parallel inputs generally 1390 which correspond in number with the order of the radix. Scalars 1400–1406 couple these inputs to summers 1408–1410 the outputs of which are in turn summed in summer 1412 and scaled or truncated in unit 1414. The resultant is a serial output of one complex value among the R=4 possible complex values. The values applied to the scalars are provided by complex scaler 1302 which provides one column 1420–1426 of scale factors, during one pass through the inputs sample set. The number of columns correspond with the order R of the sliced radix. Here a fill radix 4 would compute 16 vectors from the 16 complex scale factors. Here however the sliced radix only computes 1/R of the scale factors on each pass through the input array. Of course where sliced radix processors are applied in parallel to an input sample set the number of passes through the sample set is reduced proportionately as shown in FIGS. 13AB. Since the first of the scalars 1400 applies a constant scale factor of unity its use may be avoided.

FIG. 14B is a butterfly representation of the sliced radix processor shown in FIG. 14A. Input samples derived from a 4K input sample set are shown with the appropriate interleaving. Only one of the nodes a–d of the butterfly, i.e. node "a" is computed and that is supplied as a serial output 1450 to the remaining row and column portions of the RC transform module 414 (See FIG. 4).

Figure 15:
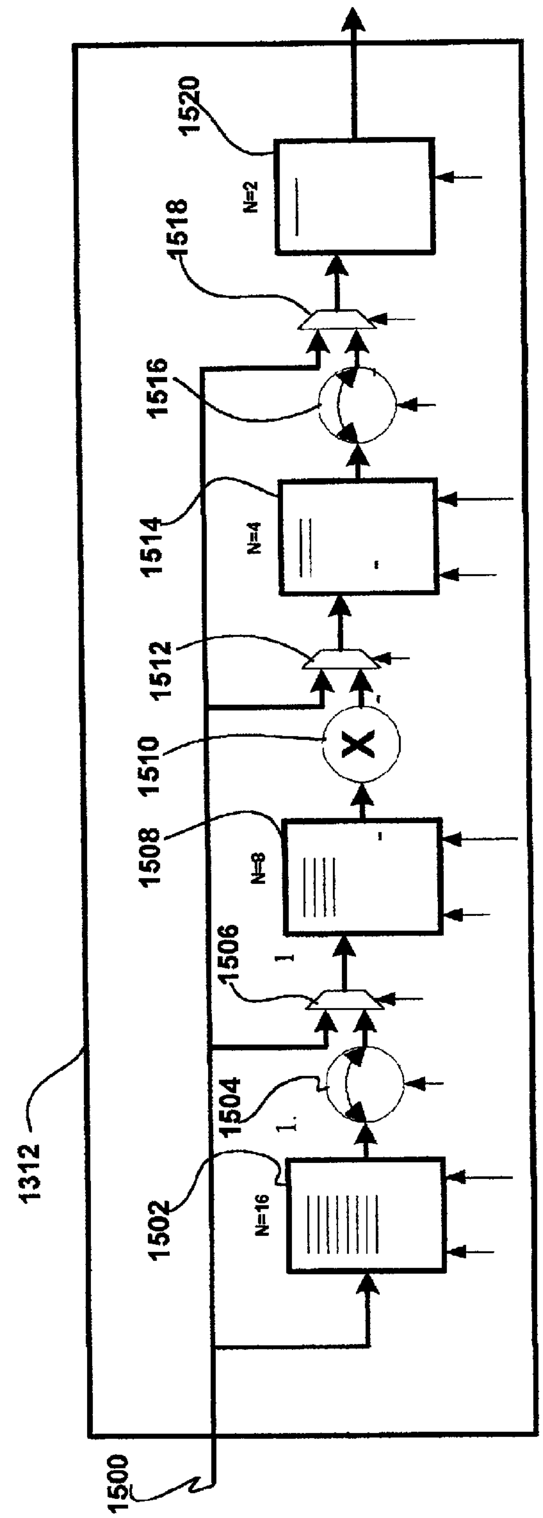
FIG. 15 is a hardware block diagram of an embodiment of a variable radix component within the row and column hardware portions of the Fourier transform processor shown in FIGS. 13CD.

FIG. 15 is a hardware block diagram of an embodiment of a variable radix component 1312 (See FIG. 13) within the row and column component portions of the Fourier transform engine 322 (See FIG. 3). The input to the circuit 1500 is switchably coupled into the cascade of fixed radix order "2" processors 1502, 1508, 1514, 1520 at a point at which the product of the radix orders corresponds with the size of the overall transform to be performed. Switches 1506, 1512, and 1518 couple the input line 1500 to respectively radix 1508, 1514, and 1516. Rotator 1504 couples the output of radix 1502 to the input of radix 1508 via switch 1506. Complex multiplier 1510 couples the output of radix 1508 to the input of radix 1514 via switch 1512. Rotator 1516 couples the output of radix 1514 to the input of radix 1520 via switch 1518. In alternate embodiments of the invention where sample sizes exceed 4k the range of configurability may be increased by extending the cascade.

Figure 16:
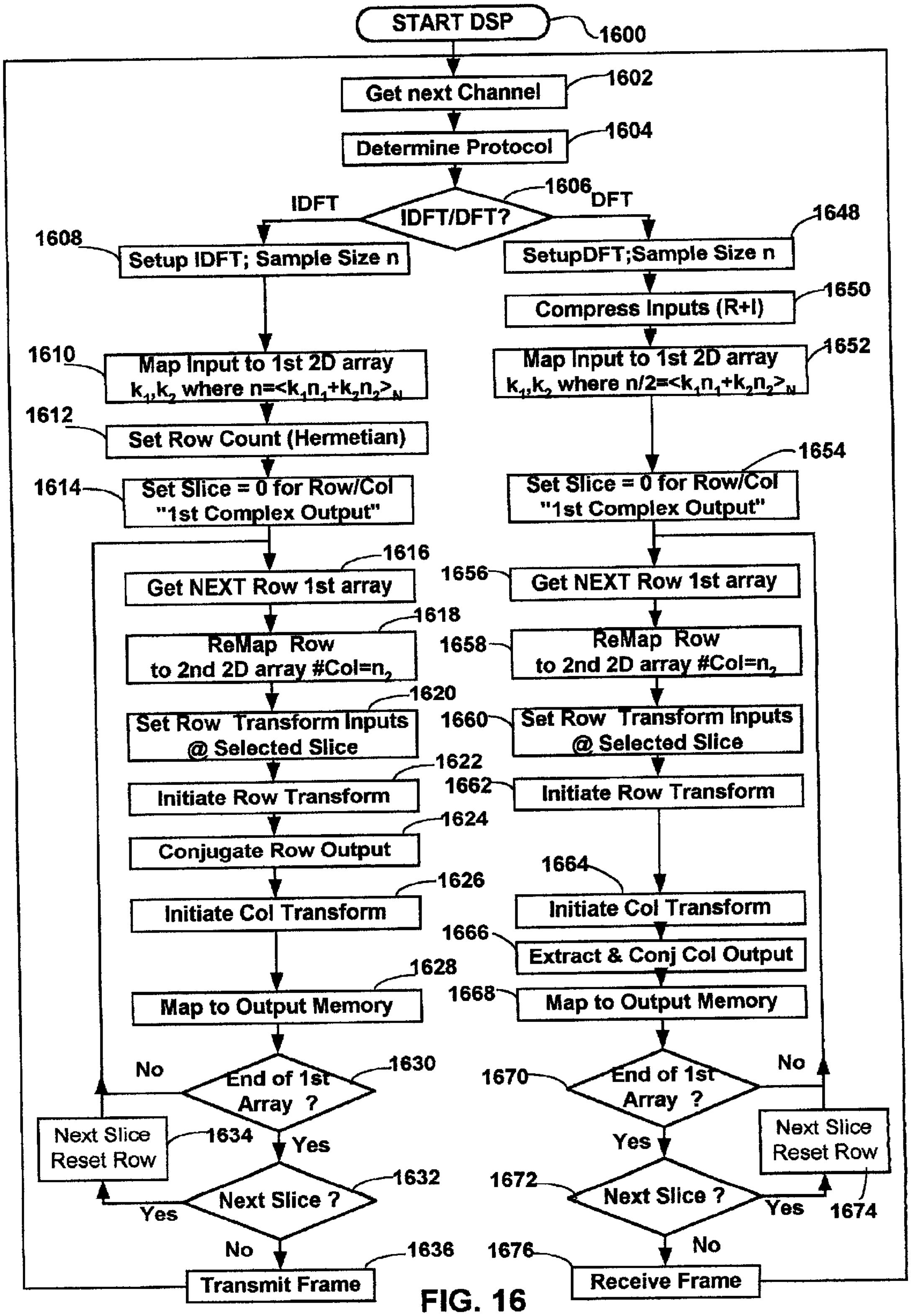
FIG. 16 is a process flow diagram of the DFT and IDFT processes implemented by the Fourier transform processor shown in FIGS. 13A–D.

FIG. 16 is a process flow diagram of the DFT and IDFT processes implemented by the Fourier transform engine shown in FIGS. 13A–D. Processing begins after initialization 1600 in process 1602 in which a packet containing the sample set corresponding with the next channel is input into memory. In process 1604 the protocol associated with the channel is determined. Control is then passed to decision block 1606 in which a determination is made as to the transform to be performed, e.g. DFT/IDFT. This determination may be made directly on the basis of the header on the incoming packet, or the state of the switch 420 which couples the upstream and downstream path to input memories 416–418. Next in process 1648 the sample size is determined based on the indicia in the device packet header. This determination may be made directly as a result of information in the header, or indirectly by correlating the channel identifier in the header with the parameters stored for the channel in main memory 326 or the component register during session setup. (See FIG. 4). Once the sample size is determined the row and column transform parameters (See FIG. 11C) are used to configure the RC component 414 (See FIG. 4) Where the input sample set is comprised solely of real data it may be compressed into half the number of complex data, which is accomplished in process 1650. Next in process 1652 the input sample set is mapped into a first two dimensional array 800 (See FIG. 9A). Control is then passed to process 1654 in which the complex output or slice of the sliced radix component at the input of the RC transform is set. Next in process 1656 the first row of the 2D input sample set array is fetched and in process 1658 it is folded/decomposed into a second 2D array with a number of columns equal to the order "R" of the sliced radix input to the RC transform. The parallel inputs of all rows in the second decomposed array are successively applied to the row transform in processes 1660–1664 during which the row and column transforms are applied to these inputs. Then in processes 1666–1668 the output of the column transform is expanded using both frequency domain coefficients and their complex conjugates to populate the output memory. In decision process 1670 this process is repeated with the fetching of the next row in the 1st 2D sample array in process 1656. This loop is repeated until the end of the rows in the 2nd 2D array at which point a determination is made in decision process 1670 as to whether another slice remains for the sliced radix input to take on the input sample 2D array. If so the row counter for the first 2D array is reset and the next slice scalar input is provided to the inputs of the sliced radix in process 1674, after which control returns to process 1656 for the fetching of the next row.

When the processing of all slices across all input rows is complete control passes from decision process 1672 to the receive frame process 1676 in which the frequency domain coefficients are decoded and framed. Subsequently control returns to process 1602 for the fetching or delivery of the next channel to the RC transform 414 (See FIG. 4).

If alternately, in decision process 1606 a determination is made that the transform to be performed is an IDFT then control passes to process 1608 in which the sample size is determined based on the indicia in the device packet header. Once the sample size is determined the row and column transform parameters (See FIG. 11C) are used to configure the RC component 414 (See FIG. 4). Next in process 1610 the input sample set is mapped into a first two dimensional array 850 (See FIG. 9B). Control is then passed to process 1612 in which the row count to be processed is reduced by the number of conjugates if the input frequency domain sample set exhibits hermetian symmetry. Control is then passed to process 1614 in which the complex output or slice of the sliced radix component at the input of the RC transform is set. Next in process 1616 the first row of the 2D input sample set array is fetched and in process 1618 it is folded/decomposed into a second 2D array with a number of columns equal to the order "R" of the sliced radix input to the RC transform. The parallel inputs of all rows in the second decomposed array are successively applied to the sliced radix input of the row transform in processes 1620–1626 during which the row and column transforms are applied to these inputs. During this process the row output is conjugated to recapture the rows for which the transform was avoided due to the hermetian symmetry in the input sample set. Then in processes 1628 the outputs of the column transforms are placed in output memory. In decision process 1630 this process is repeated with the fetching of the next row in the 1st 2D sample array in process 1616. This loop is repeated until the end of the rows in the 2nd 2D array at which point a determination is made in decision process 1630 as to whether another slice remains for the sliced radix input to take on the input sample 2D array. If so the row counter for the first 2D array is reset and the next slice scalar input is provided to the inputs of the sliced radix in process 1634, after which control returns to process 1616 for the fetching of the next row.

When the processing of all slices across all input rows is complete control passes from decision process 1632 to the transmit frame process 1636 in which the time domain coefficients are passed to the AFE for transmission to a subscriber. Subsequently control returns to process 1602 for the fetching or delivery of the next channel to the RC transform 414 (See FIG. 4).

Figure 17:
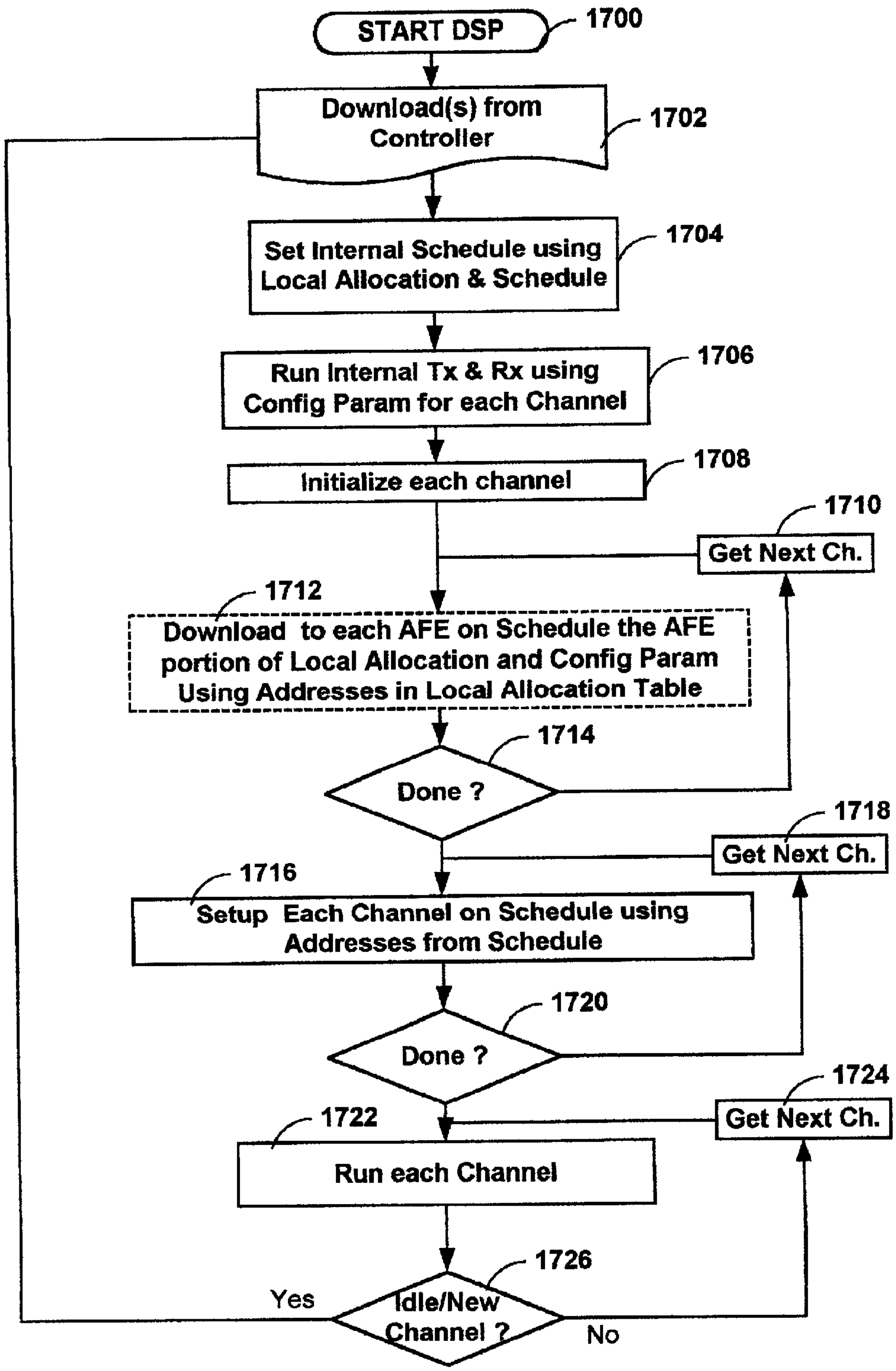
FIG. 17 is a process flow diagram of representative processes executed by the DSP shown in FIGS. 3–4.

FIG. 17 is a process flow diagram of representative processes executed by the DSP shown in FIGS. 3–4. Processing begins at process 1700 subsequent to which downloads 1702 from the DSLAM controller of the Local Allocation and Configuration parameter tables is accomplished. Next in process 1704 the DSP sets an available process time slot for the allocated channel(s) using resident or downloaded parameters associated with the specific protocol, e.g. G.Lite, ADSL, VDSL, required to support the channel. Then Tx & Rx modules are activated in process 1706. Then control is passed to process 1708 to initiate each channel. Control then passes to process 1712 for the download to each AFE of the local allocation and configuration tables relevant to the target AFE. If all channels have been provisioned in a corresponding targeted AFE(s) then decision process 1714 passes control to the setup phase for each channel in process 1716. If alternately, provisioning is not complete control returns via process 1718 in which the local allocation and configuration parameter tables for the next channel and its associated target AFE are downloaded.

The setup of each channel occurs in process 1716 using configuration parameters appropriate to whichever X-DSL protocol the channel will implement. Until this is complete control is returned by decision process 1720 to next channel process 1718 until all channels have been setup. Control then passes to process 1722 in which transmit and receive operations are conducted in round robin or other repetitive fashion for each channel. Either a new channel or an idle detection among existing channels will be detected in decision process 1726 in which event control will be passed to process 1702 for the download of new allocation and configuration parameters from the DSLAM controller.

Figures 18A, 18B:
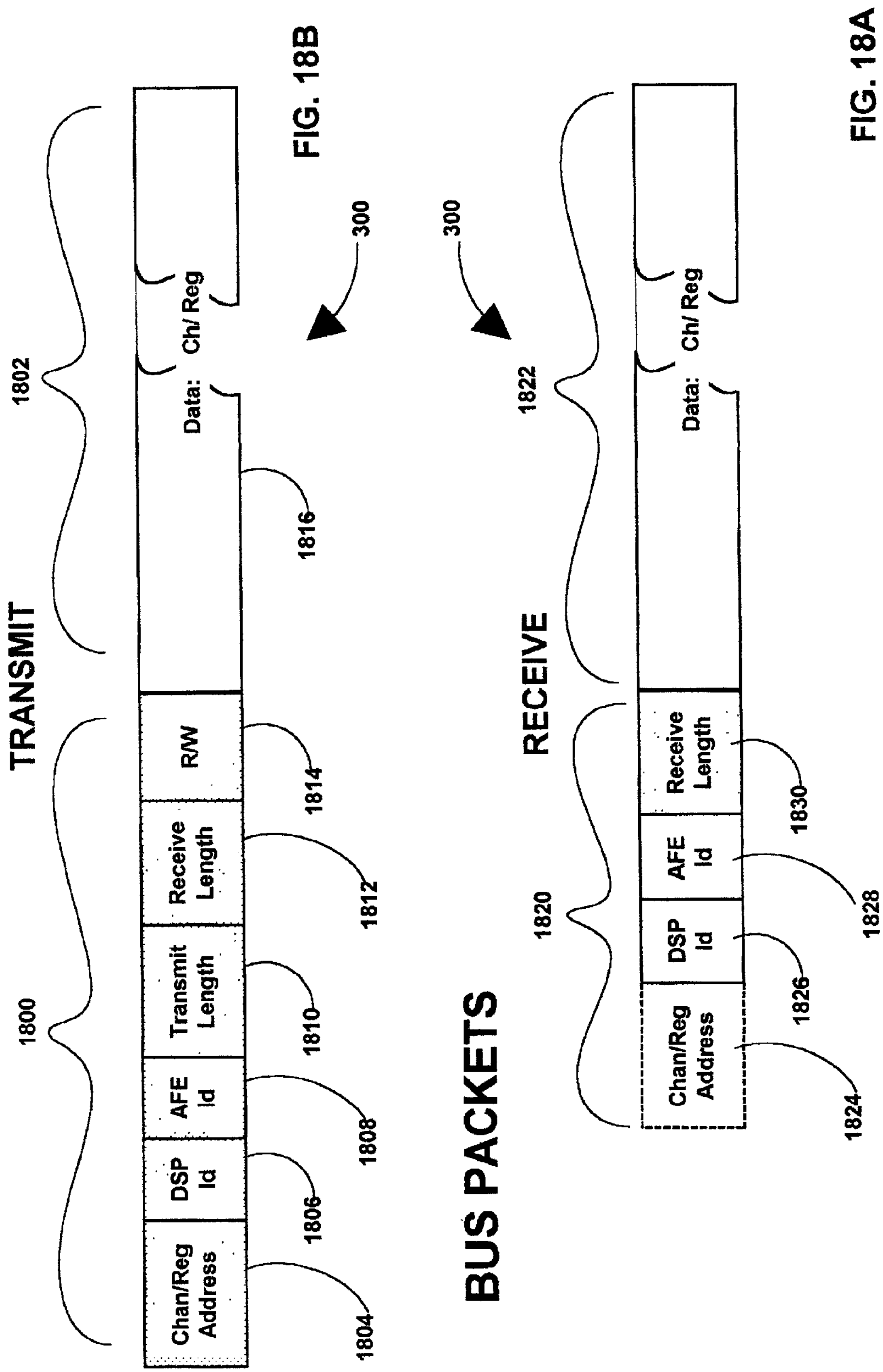
FIGS. 18A–B are detailed structural views of the receive and transmit packets respectively for transport of data on the system bus.

FIGS. 18A–B are detailed structural views of the receive/upstream and transmit/downstream packets 300 respectively for transport of data on the system bus shown in FIG. 3. The transmit packet comprises a header and a payload portion 1802. The header includes fixed length fields 1804–1814. Field 1804 records the channel or control register address. Field 1814 is the read/write field. If the field is set with a read bit the DSP is requesting data from the AFE. The data may be channel data or information from a specific module within the AFE. These latter requests are register requests. A register is the memory location where control parameters for a module are stored. They are memory mapped and are part of control table 326 (See FIGS. 3–4). Alternately, if field 1814 is set with a write bit the received packets data portion 1802 contains data to be written to a corresponding channel or register. If the data is written to a channel it is communicated through the AFE transmit path for that channel to the subscriber. If the data is written to a register it is communicated to one or more of the modules in the transmit/receive path for processing a particular channel. The DSP ID field 1806 is an optional identification field useful when more than one DSP can access the DSP bus. The AFE ID field 1808 is used to target a specific AFE on the bus for processing of the packet. When the AFE MAC 346 (See FIG. 4) detects this field it accepts the packet from the bus. The transmit length field 1810 indicates for write operations how much data the AFE will expect in the payload portion 1802 of the packet. The receive length accompanies a read request in field 1814 and indicates how much data the AFE should pass to the requesting DSP.

The receive packet passes from the AFE to the corresponding DSP on bus 216 (See FIG. 3). The bus is bi-directional. The receive packet contains a header 1820 and a payload. The header contains fields 1826,1828 and 1830 for indicating the receiving DSP, the sending AFE, and the length of the payload in the packet, respectively. Optionally the packet may contain a channel/register address field 1824 for correlating the payload with a specific channel and register. Where a single DSP masters the bus 216 this field may not be required.

Figure 19B:
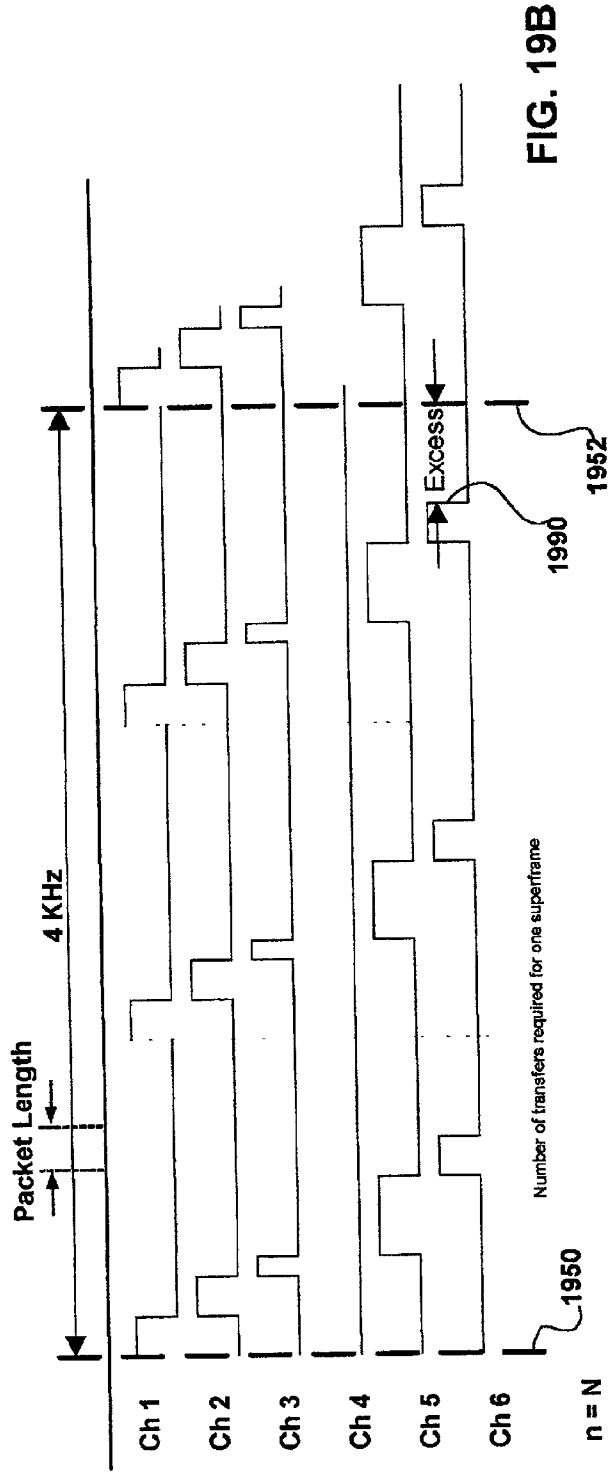
FIGS. 19A–B are detailed timing diagrams of one and many channels of subscriber line data respectively on the system bus.
Figure 19A:
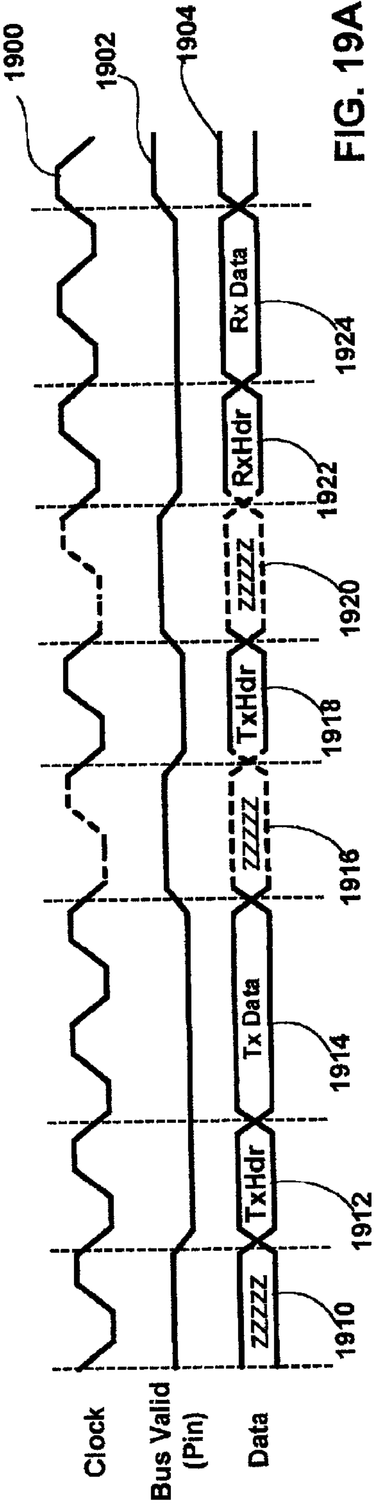

FIGS. 19A–B are detailed timing diagrams of one and many channels of subscriber line data respectively on the bus shown in FIG. 3. FIG. 19A shows a bus signal diagram with a clock signal 1900 a bus valid pin signal 1902 and a data signal 1904. This bus employs master-slave protocol where all bus transactions start with a header byte transmitted by the bus master. In an embodiment of the invention the bus is a synchronous bus with all master and slaves served by the same clock source. Only one device on the bus is selected to be the bus master. The bus master is responsible for bus scheduling to guarantee there in no bus contention. The bus master transmits header byte when all the slaves on the bus have de-asserted their BUS_VALID signal and are in listening state. The header holds the receivers address information as well as the type of bus transaction to be followed.

Transmit operation is when data is transmitted from the Master (DSP) to a slave (AFE). When all the slaves on the bus have de-asserted their BUSVALID signals 1910 and are in listening state the bus master transmits a Transmit Header word 1912. The header holds the AFE and channel select address information as well as the transfer length. Data transfer 1914 begins immediately after the header word. The BUSVALID signal 1902 is asserted by the master (DSP) when header byte is transmitted and remains asserted until data transmit is complete. Transmit operation ends 1916 when BUSVALID is de-asserted.

Receive operation is when data is transmitted from a slave to the master (DSP). Bus master initiates the receive operation. Bus master selects the AFE device by broadcasting a Transmit Header 1918 on the bus. BUSVALID signal is asserted by the master during header cycle and released 1920 immediately The header holds the AFE and Channel select address information as well as the transfer length. The selected AFE takes control of the bus one or more cycles after header is received by asserting the BUSVALID 1922. The slave transmits the transmit header word followed by the data 1924.

All devices on the bus must wait for BUSVALID to be de-asserted before attempting to transmit data on the bus. Slave devices are selected by the Master device to use the bus. Master device must guarantee by design that only one slave device is selected at any one time. A data transaction by a slave can not be interrupted by the master until it is complete. The transfer length per packet in either direction is controlled by the header information. In the transmit operation DSP sets TLEGTH 1810 value in the header and transmits that many number of bytes of data to the selected channel. FIFO overrun/under-run status bits are set accordingly in the status registers in the target AFE. In receive operation DSP sets the upper limit of packet transfer length 1812 in the transmit header and the AFE transmits that many bytes to DSP or if not available can choose to transmit less bytes by setting the number of bytes sent 1830 in the receive header accordingly. FIFO overrun/under-run condition is recorded in the status registers. The DSP uses a Channel Schedule table 326 (See FIG. 3) in the DSP to access the channels (See FIG. 4). This table holds entries for packet transfer length per channel for both receive and transmit. A zero entry in these fields indicates a channel is not active (Alternately a bit can be assigned to indicate active/none-active per channel in the table). The DSP may service the Channel Schedule table in a circular fashion. This table in an embodiment of the invention is serviced at n×4 KHz frequency. The value of n is programmable and is directly related to the packet sizes selected. This guaranties the bandwidth allocated to each channel. There is no need to synchronize this 4 KHz to frame boundaries in each channel as long as the packet size is a fraction of the frame size.

FIG. 19B shows how DSP bus bandwidth is allocated to six channels. Channel 4 is 30 inactive. Channels 1, 2, and 6 are ADSL Channel 5 is VDSL, and channel 3 is G.lite. The length of the transmit/receive packet and the number of transfers per 4 Khz cycle 750–752 determines the total bandwidth per channel. Number of transfers per cycle is the same for all active channels but the length of transfer can be different per channel. The number of transfers per cycle and the transfer length must be chosen such that the excess bandwidth period 1990 is minimum (less than 4 Khz/No TX per cycle).

Figure 20A:
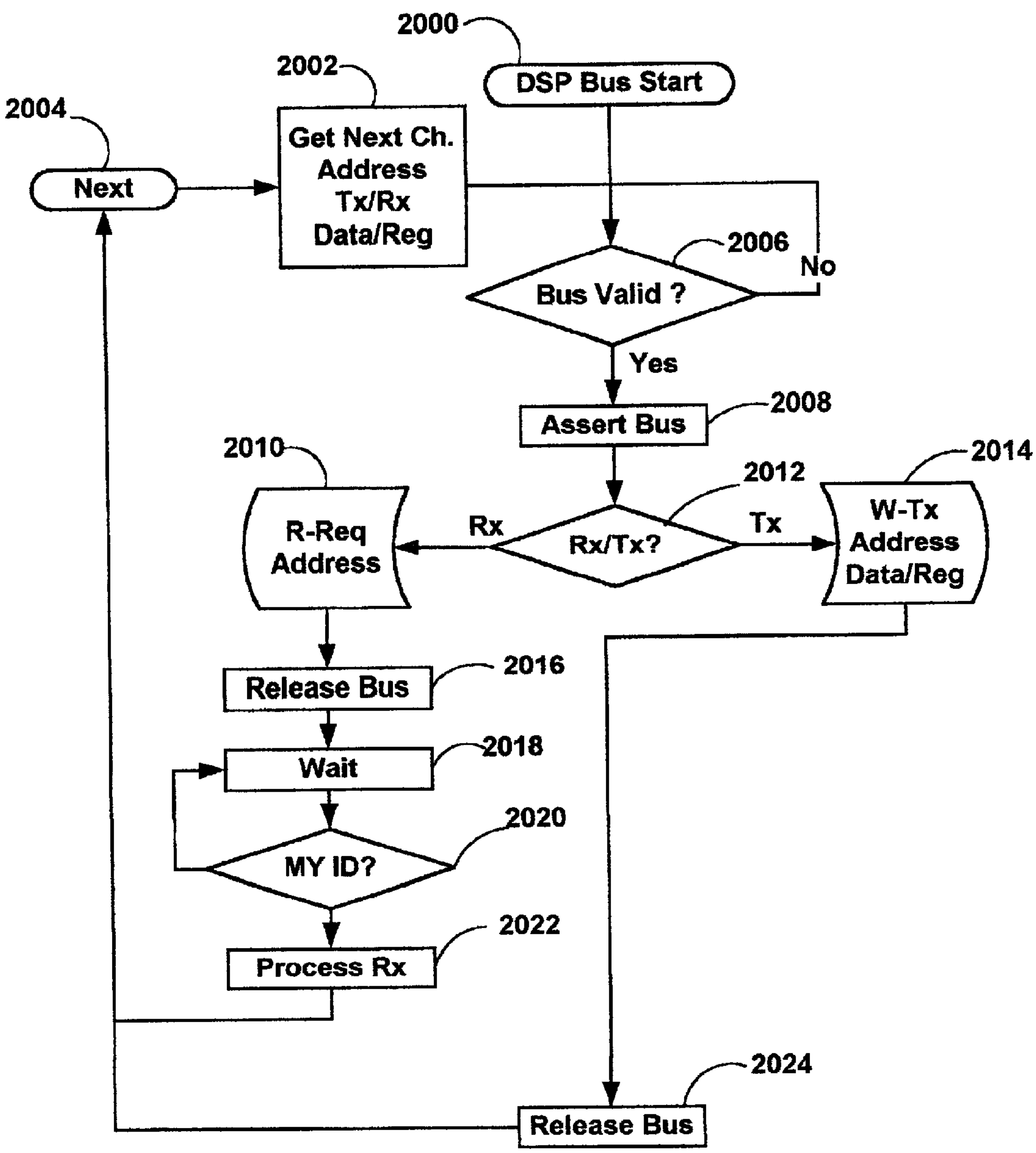
FIGS. 20A–B are process flow diagrams showing a portion of the processes executed by the DSP and AFE I/O interfaces respectively for the transport of data across the system bus.
Figure 20B:
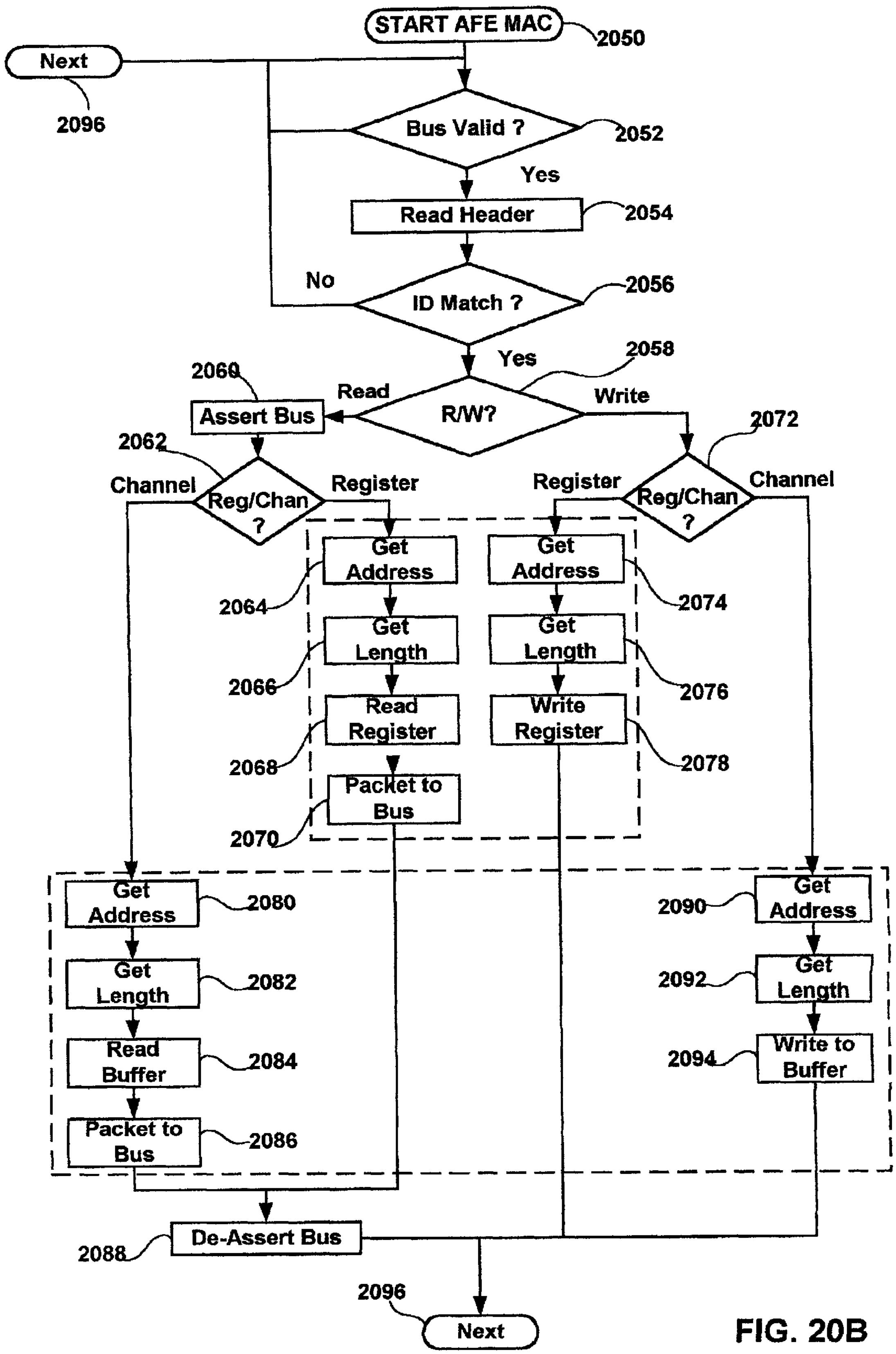

FIGS. 20A–B are process flow diagrams showing a portion of the processes executed by the DSP and AFE I/O interfaces respectively for the transport of data across the bus shown in FIG. 3.

In FIG. 20A processing for the DSP I/O interface begins at start block 2000 in which the DSP I/O interface including PAD 316 FIFO buffer controllers 318 and DSP MAC 314 (See FIG. 3) are enabled. Control is passed to decision block 2006 in which a determination is made as to the status of bus valid signal line 1902 (See FIG. 19A). When that determination is in the affirmative control is passed to process block 2008 in which the bus valid signal line is asserted, after which control is passed to decision block 2012. In decision block 2012 a determination is made based on the channel schedule received from the core processor 334 (See FIG. 3) and/or stored in schedule table 326 as to whether the next scheduled bus transaction for the DSP is a Tx or Rx. If the scheduled operation is a transmit then the PAD 316 gets the next packet to be transmitted from FIFO controller 318 and appends the appropriate header with channel ID etc. Subsequently control is passed to process 2024 in which the bus is released by MAC 314. Alternately, if in decision process 2012 an receive operation for a selected channel is indicated control is passed to request block 2010 in which the PAD prepares a read request header and places it on the bus. Subsequently control passes to process 2016 in which the bus valid signal line is de-asserted. Control is then passed to process 2018 in which a wait state is introduced, subsequent to which a determination is made in decision block 2020 as to whether the bus has been reasserted by the responding AFE. This may also involve a determination as to whether the received packet has an DSP ID field 1826 (See FIG. 6A) which corresponds with that of the receiving DSP. If the determination is affirmative, control passes to process block 2022 for receipt of the data which is written to FIFO buffer 400 via controller 318. Control then returns to next block 2004 in which the core processor supplies the next channel, address, state (Tx/Rx) and other information to the PAD. Control then returns to decision block 2006.

In FIG. 20B processing for the AFE I/O interface is set forth. That interface includes AFE MAC 346, PAD 348 and FIFO controllers 350,356 and associated buffers 352,354. Processing begins at start block 2050 from which control passes to decision process 2052. In decision process 2052 a determination is made by the AFE MAC as to whether the Bus Valid signal line is asserted. In the event of an affirmative determination control is passed to process 2054. In process 2054 the header is read and in the following decision process 2056 a determination is made as to whether the AFE ID in the header matches the AFE ID. In the event of an affirmative decision control is passed to decision block 2058. In decision block 2058 a determination is made as to whether a read or write tag is present in header field 1814 (See FIG. 18B). If a read operation is indicated then control passes then the AFE MAC asserts the bus valid signal line after which control passes to decision block 2062. In decision block 2062 the address field 1804 in the header (See FIG. 18B) is read to determine whether a register or channel access is requested by the DSP. If a read register request has been indicated then in processes 2064–2070 the address to be read, the length of the data to be read and the actual reading and packetizing of the data on the bus with the appropriate header are implemented by the combined AFE I/O interface components. Subsequently, control passes to process 2088 in which the bus is deasserted and control is passed to next block 2096.

Alternately, if in decision process 2062 a read channel operation is indicated then in processes 2080–2086 the channel address and length are determined based on the contents of header fields 1804 and 1812 Then the FIFO buffer supplies the appropriate data for the selected channel to the PAD appends the appropriate information in the header of the outgoing packet and the MAC places that data on the bus 310A.

Alternately, if in decision process 2058 a determination is made that the DSP header indicates a write operation then control is passed to decision process 2072 in which a determination is made on the basis of the address in the header field 1804 (See FIG. 18B) as to whether the write is directed to a register, e.g control table 480 (See FIG. 4) or to a channel. If the write is directed to a channel then in processes 2074–2078 the payload portion of the bus packet 1802 (See FIG. 18B) is passed by the AFE I/O interface to the appropriate register after which control is returned to next block 2096. Alternatively, if the payload to be written is destined for a channel for a selected subscriber line then control is passed to processes 2090–2094 in which the payload of the appropriate length is removed from the bus and written to the transmit FIFO buffer, subsequent to which control returns to next process block 2096.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A digital signal processor (DSP) for processing a plurality of multi-tone communication channels, and the DSP comprising a two-dimensional Fourier transform circuit including:

an input memory for storing a succession of two-dimensional sample array having row and column dimensions corresponding with a number of tones in a corresponding one of the plurality of multi-tone communication channels;

row transform components including at least one sliced radix component of order "R" performing "R" partial row transforms of each successive two-dimensional sample array from the input memory and generating in each partial row transform N/R possible complex outputs, where N corresponds to a number of samples in an associated two-dimensional sample array; and column transform components with an input coupled to the row transform components to generate complete column transforms from each partial row transform.

2. The digital signal processor of claim 1, wherein the at least one sliced radix component of the row transform components further comprises:

a plurality of sliced radix components equal in a quantity to the order R, and each of the plurality of sliced radix components generating complex outputs from a corresponding unique output node of a radix R butterfly.

3. The digital signal processor of claim 1, wherein the input memory further comprises:

a quantity R of discrete memories each storing a corresponding portion of each two-sample array and each coupled to a corresponding input of the at least one sliced radix component.

4. The digital signal processor of claim 1, further comprising:

a packet based interface for coupling the DSP to a plurality of analog front ends (AFE) each associated with transmission and reception of at least one of the plurality of multi-tone communication channels.

5. The DSP of claim 1, wherein the row transform components and the column transform components of the Fourier transform circuit each include:

at least one corresponding variable radix element with an order of the radix varying in correspondence with dimensions of each two-dimensional sample array.

6. The DSP of claim 1, wherein the succession of two-dimensional sample arrays stored in the input memory include both two-dimensional sample arrays of time domain samples and two-dimensional sample arrays of frequency domain samples.

7. The DSP of claim 1, wherein the row and column dimensions of each two-dimensional sample array correspond both with the number of tones together with a domain of the corresponding one of the plurality of multi-tone communication channels.

8. A method for processing a plurality of multi-tone communication channels, comprising:

configuring each sample set of one of frequency domain samples and time domain samples, from each of the plurality of multi-tone communications channels as a two-dimensional array having row and column dimensions corresponding at least with a number of tones in the associated one of the plurality of multi-tone communication channels, performing a two-dimensional Fourier transform on each two-dimensional array configured in the configuring act, including:

generating sliced radix transforms of an order R for each of N/R selected subsets of each two-dimensional array where N corresponds to a number of samples in an associated two-dimensional array, where each selected subset includes R samples and where each sliced radix transform corresponds with a radix R transformation of R inputs to a selected one among R complex outputs, completing row and column transforms on the complex outputs generated in the generating act; and performing the generating and completing acts for remaining ones of the "R" complex outputs, to transform each sample set between a corresponding one of a time domain and a frequency domain.

9. The method of claim 8, wherein the performing act further comprises one of the acts of:

repetitively performing the generating and completing acts for remaining ones of the R complex outputs, and concurrently performing the generating and completing acts for remaining ones of the R complex outputs.

10. The method of claim 8, further comprising:

interfacing with a plurality of analog front ends (AFE) each associated with transmission and reception of at least one of the plurality of multi-tone communication channels subject to the configuring and performing acts.

11. The method of claim 8, wherein the completing act further comprises:

varying an order of a radix to conform with dimensions of each two-dimensional array.

12. The method of claim 8, wherein successive sample sets configured in the configuring act include both upstream and downstream multi-tone communication channels.

13. The method of claim 8, wherein the row and column dimensions of each two-dimensional sample array correspond both with the number of tones together with the domain of the corresponding one of the plurality of multi-tone communication channels.

* * * * *